US012812560B2

(12) United States Patent
Logothetis et al.

(10) Patent No.: US 12,812,560 B2
(45) Date of Patent: Nov. 24, 2026

(54) DETERMINATION OF AN UPLINK TRANSMISSION CONFIGURATION

(71) Applicant: AIRSPAN IP HOLDCO LLC, Boca Raton, FL (US)

(72) Inventors: Andrew Logothetis, High Wycombe (GB); Honey Kanwar Singh Sarao, Slough (GB); Marlon Peter Persaud, Beaconsfield (GB)

(73) Assignee: AIRSPAN IP HOLDCO LLC, Boca Raton, FL (US)

( * ) Notice: Subject to any disclaimer, the term of this patent is extended or adjusted under 35 U.S.C. 154(b) by 539 days.

(21) Appl. No.: 18/198,781

(22) Filed: May 17, 2023

(65) Prior Publication Data

US 2023/0388942 A1 Nov. 30, 2023

(30) Foreign Application Priority Data

May 26, 2022 (GB) ..................................... 2207780

(51) Int. Cl.
*H04W 52/34* (2009.01)
*H04W 52/26* (2009.01)

(52) U.S. Cl.
CPC ....... *H04W 52/346* (2013.01); *H04W 52/262* (2013.01)

(58) Field of Classification Search
CPC ......... H04W 52/00-60; H04W 52/262; H04W 52/346
See application file for complete search history.

(56) References Cited

U.S. PATENT DOCUMENTS

| | | | | |
|---|---|---|---|---|
| 2002/0094833 | A1 | 7/2002 | Lieshout et al. | |
| 2010/0317385 | A1 | 12/2010 | Kazmi et al. | |
| 2013/0005375 | A1* | 1/2013 | Chen .................. | H04W 72/541 455/509 |
| 2013/0310092 | A1* | 11/2013 | Tabet .................... | H04L 1/0003 455/501 |
| 2014/0119333 | A1 | 5/2014 | Hedlund et al. | |
| 2014/0126467 | A1* | 5/2014 | Lu .......................... | H04L 1/009 370/328 |

(Continued)

OTHER PUBLICATIONS

Singh et al., "Adaptive Sub-Carrier Level Power Allocation in OFDMA Networks", Jan. 2015, IEEE Transactions on Mobile Computing, vol. 14, pp. 28-41 (Year: 2015).*

(Continued)

*Primary Examiner* — Raymond S Dean
(74) *Attorney, Agent, or Firm* — Haynes Beffel & Wolfeld LLP; Andrew L. Dunlap; Jason Liao

(57) ABSTRACT

In brief overall summary there is provided an apparatus and a method of operating an apparatus, the apparatus is comprising: communication circuitry configured to receive information indicative of a quality of a wireless uplink connection; and scheduling circuitry configured to determine an uplink transmission configuration defining a subset of uplink resource blocks allocated to the wireless uplink connection, the subset of uplink resource blocks determined based on a simultaneous consideration of both of the quality of the wireless uplink connection and a power spectrum distribution of a total power budget across the uplink resource blocks, wherein the power spectrum distribution is non-uniform across the uplink resource blocks.

22 Claims, 25 Drawing Sheets

(56) References Cited

U.S. PATENT DOCUMENTS

Figure 1:
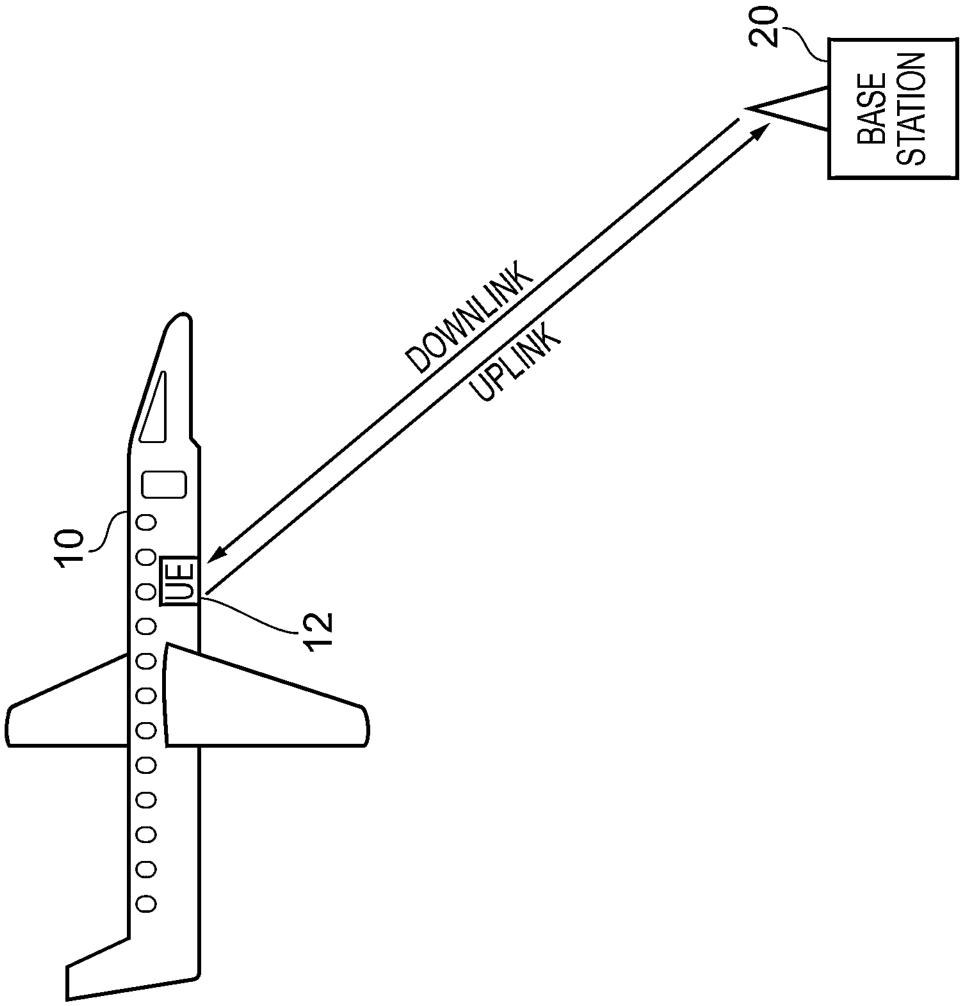

| | | | | |
|---|---|---|---|---|
| 2014/0135009 | A1* | 5/2014 | Liu | H04W 36/0085 455/436 |
| 2014/0241190 | A1* | 8/2014 | Park | H04B 7/065 370/252 |
| 2014/0369215 | A1* | 12/2014 | Yeo | H04W 24/08 370/252 |
| 2015/0373649 | A1 | 12/2015 | Tabet et al. | |
| 2017/0264401 | A1 | 9/2017 | Soong et al. | |
| 2018/0014261 | A1* | 1/2018 | Miranda | H04W 52/367 |
| 2021/0160713 | A1* | 5/2021 | Yang | H04L 1/0026 |
| 2021/0351902 | A1* | 11/2021 | Zhang | H04B 17/309 |

OTHER PUBLICATIONS

EP Extended Search Report from EP23175270.0 dated Oct. 17, 2022, 14 pages.

Sony: "Adjacent Channel Interferene in non-overlapping subband Full Duplex TDD operations," 3GPP TSG RAN WG1 #109-e e-meeting agenda item, Apr. 29, 2022, 6 pages.

GB Search Report from GB2207780.4 dated Oct. 24, 2022, 6 pages.

* cited by examiner

| RBG | 0 | 1 | 2 | 3 | 4 | 5 | 6 | 7 | 8 | 9 | 10 | 11 | 12 | 13 | 14 | 15 | 16 |
|---|---|---|---|---|---|---|---|---|---|---|---|---|---|---|---|---|---|
| Wide Band CQI | 3 | | | | | | | | | | | | | | | | |
| Differential Sub-Band CQI Repoerted | 3 | 2 | 3 | 0 | 3 | 1 | 0 | 3 | 2 | 0 | 3 | 0 | 3 | 0 | 1 | 2 | 0 |
| Wideband MCS | 2 | | | | | | | | | | | | | | | | |
| Wideband SINR (dB) | -3.10 | | | | | | | | | | | | | | | | |
| Assumed Sub-Band CQI level | | 5 | | 3 | | 4 | 3 | | 5 | 3 | | 3 | | 3 | 4 | 5 | 3 |
| Number of negative offsets | 6 | | | | | | | | | | | | | | | | |
| Assumed MCS | | 6 | | 2 | | 4 | 2 | | 6 | 2 | | 2 | | 2 | 4 | 6 | 2 |
| Estimated SINR (dB) | -8.44 | 0.98 | -8.44 | -3.10 | -8.44 | -1.02 | -3.10 | -8.44 | 0.98 | -3.10 | -8.44 | -3.10 | -8.44 | -3.10 | -1.02 | 0.98 | -3.10 |

FIG. 8

| RBGs | Power Boost (dB) | RBG Index | 1 | 8 | 15 | 5 | 14 | 3 | 6 | 9 | 11 | 13 | 16 | 0 | 2 | 4 | 7 | 10 | 12 |
|---|---|---|---|---|---|---|---|---|---|---|---|---|---|---|---|---|---|---|---|
| | | Estimated SINR (dB) | 0.98 | 0.98 | 0.98 | -1.02 | -1.02 | -3.10 | -3.10 | -3.10 | -3.10 | -3.10 | -3.10 | -8.44 | -8.44 | -8.44 | -8.44 | -8.44 | -8.44 |
| 1 | 12.30 | SINR with Power Boosting (dB) | 13.28 | | | | | | | | | | | | | | | | |
| | | ESNR (dB) | 13.28 | | | | | | | | | | | | | | | | |
| | | MCS | 21 | | | | | | | | | | | | | | | | |
| | | Throughput (Mbps) | 5.38 | | | | | | | | | | | | | | | | |
| 2 | 9.29 | SINR with Power Boosting (dB) | 10.27 | 10.27 | | | | | | | | | | | | | | | |
| | | ESNR (dB) | 10.27 | | | | | | | | | | | | | | | | |
| | | MCS | 17 | | | | | | | | | | | | | | | | |
| | | Throughput (Mbps) | 7.68 | | | | | | | | | | | | | | | | |
| 3 | 7.53 | SINR with Power Boosting (dB) | 8.51 | 8.51 | 8.51 | | | | | | | | | | | | | | |
| | | ESNR (dB) | 8.51 | | | | | | | | | | | | | | | | |
| | | MCS | 14 | | | | | | | | | | | | | | | | |
| | | Throughput (Mbps) | 9.68 | | | | | | | | | | | | | | | | |
| 4 | 6.28 | SINR with Power Boosting (dB) | 7.26 | 7.26 | 7.26 | 5.26 | | | | | | | | | | | | | |
| | | ESNR (dB) | 6.58 | | | | | | | | | | | | | | | | |
| | | MCS | 12 | | | | | | | | | | | | | | | | |
| | | Throughput (Mbps) | 10.14 | | | | | | | | | | | | | | | | |
| 5 | 5.31 | SINR with Power Boosting (dB) | 6.29 | 6.29 | 6.29 | 4.29 | 4.29 | | | | | | | | | | | | |
| | | ESNR (dB) | 5.35 | | | | | | | | | | | | | | | | |
| | | MCS | 11 | | | | | | | | | | | | | | | | |
| | | Throughput (Mbps) | 11.06 | | | | | | | | | | | | | | | | |

FIG. 10a

| | | | | | | | | | | | | |
|---|---|---|---|---|---|---|---|---|---|---|---|---|
| 6 | 4.52 | SINR with Power Boosting (dB) | 5.50 | 5.50 | 5.50 | 3.50 | 3.50 | 1.42 | | | | |
| | | ESNR (dB) | 3.99 | | | | | | | | | |
| | | MCS | 9 | | | | | | | | | |
| | | Throughput (Mbps) | 11.98 | | | | | | | | | |
| 7 | 3.85 | SINR with Power Boosting (dB) | 4.83 | 4.83 | 4.83 | 2.83 | 2.83 | 0.75 | 0.75 | | | |
| | | ESNR (dB) | 2.99 | | | | | | | | | |
| | | MCS | 8 | | | | | | | | | |
| | | Throughput (Mbps) | 12.30 | | | | | | | | | |
| 8 | 3.27 | SINR with Power Boosting (dB) | 4.25 | 4.25 | 4.25 | 2.25 | 2.25 | 0.17 | 0.17 | 0.17 | | |
| | | ESNR (dB) | 2.18 | | | | | | | | | |
| | | MCS | 7 | | | | | | | | | |
| | | Throughput (Mbps) | 12.30 | | | | | | | | | |
| 9 | 2.76 | SINR with Power Boosting (dB) | 3.74 | 3.74 | 3.74 | 1.74 | 1.74 | -0.34 | -0.34 | -0.34 | -0.34 | |
| | | ESNR (dB) | 1.49 | | | | | | | | | |
| | | MCS | 6 | | | | | | | | | |
| | | Throughput (Mbps) | 11.68 | | | | | | | | | |
| 10 | 2.30 | SINR with Power Boosting (dB) | 3.28 | 3.28 | 3.28 | 1.28 | 1.28 | -0.80 | -0.80 | -0.80 | -0.80 | -0.80 |
| | | ESNR (dB) | 0.89 | | | | | | | | | |
| | | MCS | 5 | | | | | | | | | |
| | | Throughput (Mbps) | 11.06 | | | | | | | | | |

FIG. 10a (Continued)

| RBGs | Power Boost (dB) | RBG Index | 1 | 8 | 15 | 5 | 14 | 3 | 6 | 9 | 11 | 13 | 16 | 0 | 2 | 4 | 7 | 10 | 12 |
|---|---|---|---|---|---|---|---|---|---|---|---|---|---|---|---|---|---|---|---|
| | | Estimated SINR (dB) | 0.98 | 0.98 | 0.98 | -1.02 | -1.02 | -3.10 | -3.10 | -3.10 | -3.10 | -3.10 | -3.10 | -8.44 | -8.44 | -8.44 | -8.44 | -8.44 | -8.44 |
| 11 | 1.89 | SINR with Power Boosting (dB) | 2.87 | 2.87 | 2.87 | 0.87 | 0.87 | -1.21 | -1.21 | -1.21 | -1.21 | -1.21 | -1.21 | | | | | | |
| | | ESNR (dB) | 0.36 | | | | | | | | | | | | | | | | |
| | | MCS | 5 | | | | | | | | | | | | | | | | |
| | | Throughput (Mbps) | 12.30 | | | | | | | | | | | | | | | | |
| 12 | 1.51 | SINR with Power Boosting (dB) | 2.49 | 2.49 | 2.49 | 0.49 | 0.49 | -1.59 | -1.59 | -1.59 | -1.59 | -1.59 | -1.59 | -6.93 | | | | | |
| | | ESNR (dB) | -0.38 | | | | | | | | | | | | | | | | |
| | | MCS | 4 | | | | | | | | | | | | | | | | |
| | | Throughput (Mbps) | 10.76 | | | | | | | | | | | | | | | | |
| 13 | 1.17 | SINR with Power Boosting (dB) | 2.15 | 2.15 | 2.15 | 0.15 | 0.15 | -1.93 | -1.93 | -1.93 | -1.93 | -1.93 | -1.93 | -7.28 | -7.28 | | | | |
| | | ESNR (dB) | -1.04 | | | | | | | | | | | | | | | | |
| | | MCS | 3 | | | | | | | | | | | | | | | | |
| | | Throughput (Mbps) | 9.54 | | | | | | | | | | | | | | | | |

FIG. 10b

| | | | | | | | | | | | | | | | | | | | |
|---|---|---|---|---|---|---|---|---|---|---|---|---|---|---|---|---|---|---|---|
| 14 | 0.84 | SINR with Power Boosting (dB) | 1.82 | 1.82 | 1.82 | -0.18 | -0.18 | -2.26 | -2.26 | -2.26 | -2.26 | -2.26 | -2.26 | -7.60 | -7.60 | -7.60 | | | |
| | | ESNR (dB) | -1.62 | | | | | | | | | | | | | | | | |
| | | MCS | 3 | | | | | | | | | | | | | | | | |
| | | Throughput (Mbps) | 10.14 | | | | | | | | | | | | | | | | |
| 15 | 0.54 | SINR with Power Boosting (dB) | 1.52 | 1.52 | 1.52 | -0.48 | -0.48 | -2.56 | -2.56 | -2.56 | -2.56 | -2.56 | -2.56 | -7.90 | -7.90 | -7.90 | -7.90 | | |
| | | ESNR (dB) | -2.16 | | | | | | | | | | | | | | | | |
| | | MCS | 2 | | | | | | | | | | | | | | | | |
| | | Throughput (Mbps) | 8.45 | | | | | | | | | | | | | | | | |
| 16 | 0.26 | SINR with Power Boosting (dB) | 1.24 | 1.24 | 1.24 | -0.76 | -0.76 | -2.84 | -2.84 | -2.84 | -2.84 | -2.84 | -2.84 | -8.18 | -8.18 | -8.18 | -8.18 | -8.18 | |
| | | ESNR (dB) | -2.65 | | | | | | | | | | | | | | | | |
| | | MCS | 2 | | | | | | | | | | | | | | | | |
| | | Throughput (Mbps) | 9.07 | | | | | | | | | | | | | | | | |
| 17 | 0.00 | SINR with Power Boosting (dB) | 0.98 | 0.98 | 0.98 | -1.02 | -1.02 | -3.10 | -3.10 | -3.10 | -3.10 | -3.10 | -3.10 | -8.44 | -8.44 | -8.44 | -8.44 | -8.44 | -8.44 |
| | | ESNR (dB) | -3.10 | | | | | | | | | | | | | | | | |
| | | MCS | 2 | | | | | | | | | | | | | | | | |
| | | Throughput (Mbps) | 9.54 | | | | | | | | | | | | | | | | |

FIG. 10b (Continued)

| | # 1's | | | | | | | | | | | | | | | | | |
|---|---|---|---|---|---|---|---|---|---|---|---|---|---|---|---|---|---|---|
| # 0's | 0 | 1 | 2 | 3 | 4 | 5 | 6 | 7 | 8 | 9 | 10 | 11 | 12 | 13 | 14 | 15 | 16 | 17 |
| 0 | 0 | 18 | 35 | 51 | 66 | 80 | 93 | 105 | 116 | 126 | 135 | 143 | 150 | 156 | 161 | 165 | 168 | 170 |
| 1 | 171 | 188 | 204 | 219 | 233 | 246 | 258 | 269 | 279 | 288 | 296 | 303 | 309 | 314 | 318 | 321 | 323 | - |
| 2 | 324 | 340 | 355 | 369 | 382 | 394 | 405 | 415 | 424 | 432 | 439 | 445 | 450 | 454 | 457 | 459 | - | - |
| 3 | 460 | 475 | 489 | 502 | 514 | 525 | 535 | 544 | 552 | 559 | 565 | 570 | 574 | 577 | 579 | - | - | - |
| 4 | 580 | 594 | 607 | 619 | 630 | 640 | 649 | 657 | 664 | 670 | 675 | 679 | 682 | 684 | - | - | - | - |
| 5 | 685 | 698 | 710 | 721 | 731 | 740 | 748 | 755 | 761 | 766 | 770 | 773 | 775 | - | - | - | - | - |
| 6 | 776 | 788 | 799 | 809 | 818 | 826 | 833 | 839 | 844 | 848 | 851 | 853 | - | - | - | - | - | - |
| 7 | 854 | 865 | 875 | 884 | 892 | 899 | 905 | 910 | 914 | 917 | 919 | - | - | - | - | - | - | - |
| 8 | 920 | 930 | 939 | 947 | 954 | 960 | 965 | 969 | 972 | 974 | - | - | - | - | - | - | - | - |
| 9 | 975 | 984 | 992 | 999 | 1005 | 1010 | 1014 | 1017 | 1019 | - | - | - | - | - | - | - | - | - |
| 10 | 1020 | 1028 | 1035 | 1041 | 1046 | 1050 | 1053 | 1055 | - | - | - | - | - | - | - | - | - | - |
| 11 | 1056 | 1063 | 1069 | 1074 | 1078 | 1081 | 1083 | - | - | - | - | - | - | - | - | - | - | - |
| 12 | 1084 | 1090 | 1095 | 1099 | 1102 | 1104 | - | - | - | - | - | - | - | - | - | - | - | - |
| 13 | 1105 | 1110 | 1114 | 1117 | 1119 | - | - | - | - | - | - | - | - | - | - | - | - | - |
| 14 | 1120 | 1124 | 1127 | 1129 | - | - | - | - | - | - | - | - | - | - | - | - | - | - |
| 15 | 1130 | 1133 | 1135 | - | - | - | - | - | - | - | - | - | - | - | - | - | - | - |
| 16 | 1136 | 1138 | - | - | - | - | - | - | - | - | - | - | - | - | - | - | - | - |
| 17 | 1139 | - | - | - | - | - | - | - | - | - | - | - | - | - | - | - | - | - |

2006

Figure 13:
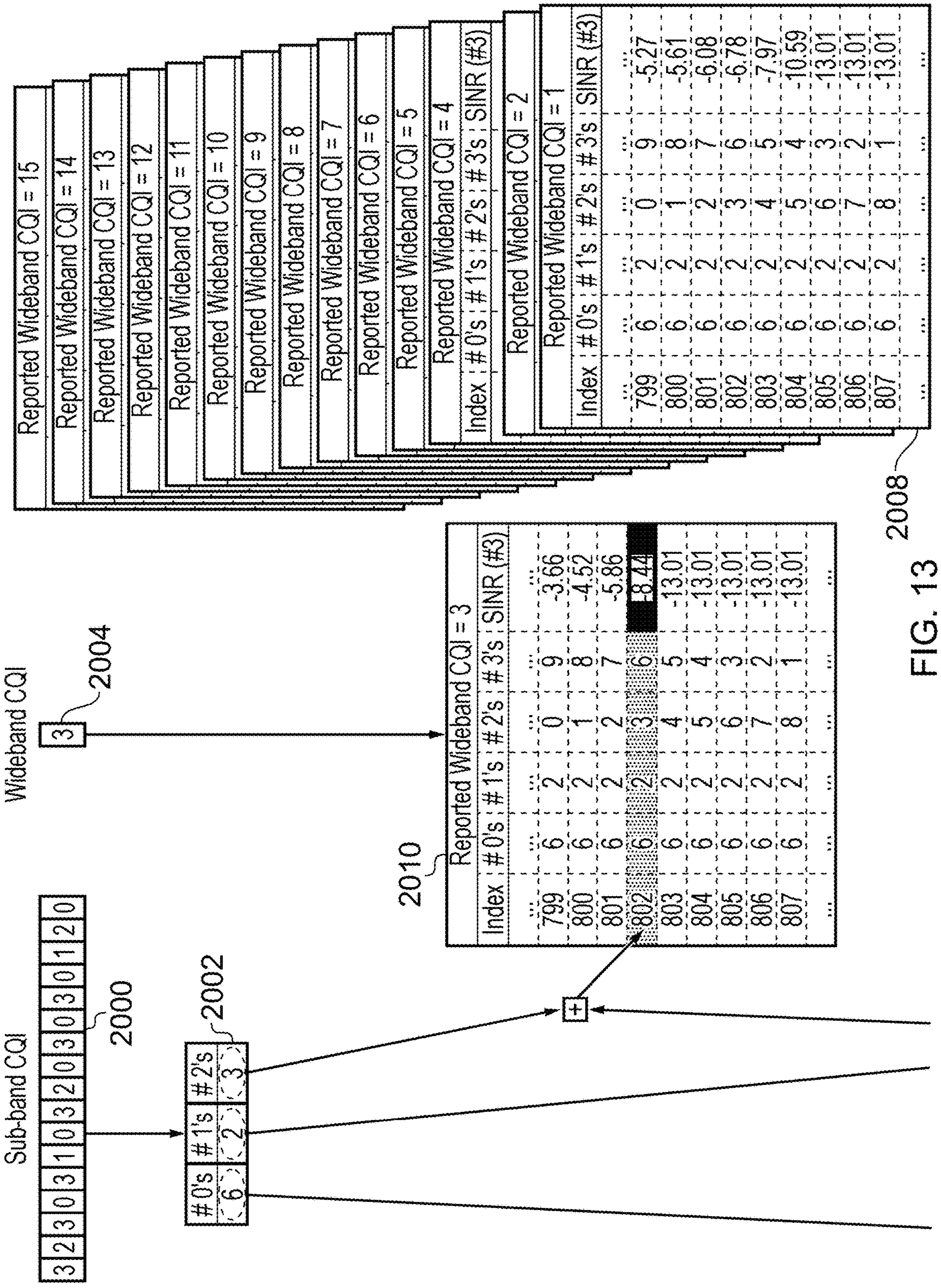

FIG. 13 (Continued)

| RBG | 0 | 1 | 2 | 3 | 4 | 5 | 6 | 7 | 8 | 9 | 10 | 11 | 12 | 13 | 14 | 15 | 16 |
|---|---|---|---|---|---|---|---|---|---|---|---|---|---|---|---|---|---|
| SINR (dB) | 2.17 | 5.40 | 4.16 | 5.68 | 3.22 | -1.59 | X | X | X | 6.87 | 4.10 | 8.04 | 4.13 | X | X | 12.38 | 3.66 |

FIG. 16

1500a

| | ESINR (dB) | | | | | | | | | | | | | | | | |
|---|---|---|---|---|---|---|---|---|---|---|---|---|---|---|---|---|---|
| RBG INDEX \ #RBGs | 1 | 2 | 3 | 4 | 5 | 6 | 7 | 8 | 9 | 10 | 11 | 12 | 13 | 14 | 15 | 16 | 17 |
| 0 | 14.48 | 11.78 | 10.40 | 9.53 | 8.70 | 6.33 | | | | | | | | | | | |
| 1 | 17.70 | 13.65 | 12.13 | 10.27 | 10.27 | | | | | | | | | | | | |
| 2 | 16.46 | 13.65 | 11.25 | 6.99 | | | | | | | | | | | | | |
| 3 | 17.98 | 12.76 | 7.46 | | | | | | | | | | | | | | |
| 4 | 15.53 | 8.41 | | | | | | | | | | | | | | | |
| 5 | 10.72 | | | | | | | | | | | | | | | | |
| 6 | | | | | | | | | | | | | | | | | |
| 7 | | | | | | | | | | | | | | | | | |
| 8 | | | | | | | | | | | | | | | | | |
| 9 | 19.18 | 13.59 | 12.10 | 10.79 | | | | | | | | | | | | | |
| 10 | 16.40 | 13.59 | 11.82 | | | | | | | | | | | | | | |
| 11 | 20.34 | 13.62 | | | | | | | | | | | | | | | |
| 12 | 16.43 | | | | | | | | | | | | | | | | |
| 13 | | | | | | | | | | | | | | | | | |
| 14 | | | | | | | | | | | | | | | | | |
| 15 | 24.68 | 13.18 | | | | | | | | | | | | | | | |
| 16 | 15.97 | | | | | | | | | | | | | | | | |

FIG. 18a

1500b

| | MCS | | | | | | | | | | | | | | | | |
|---|---|---|---|---|---|---|---|---|---|---|---|---|---|---|---|---|---|
| RBG INDEX \ #RBGs | 1 | 2 | 3 | 4 | 5 | 6 | 7 | 8 | 9 | 10 | 11 | 12 | 13 | 14 | 15 | 16 | 17 |
| 0 | 22 | 19 | 17 | 16 | 15 | 12 | | | | | | | | | | | |
| 1 | 25 | 21 | 19 | 17 | 12 | | | | | | | | | | | | |
| 2 | 24 | 21 | 18 | 13 | | | | | | | | | | | | | |
| 3 | 26 | 20 | 13 | | | | | | | | | | | | | | |
| 4 | 23 | 14 | | | | | | | | | | | | | | | |
| 5 | 18 | | | | | | | | | | | | | | | | |
| 6 | | | | | | | | | | | | | | | | | |
| 7 | | | | | | | | | | | | | | | | | |
| 8 | | | | | | | | | | | | | | | | | |
| 9 | 28 | 21 | 19 | 18 | | | | | | | | | | | | | |
| 10 | 24 | 21 | 19 | | | | | | | | | | | | | | |
| 11 | 28 | 21 | | | | | | | | | | | | | | | |
| 12 | 24 | | | | | | | | | | | | | | | | |
| 13 | | | | | | | | | | | | | | | | | |
| 14 | | | | | | | | | | | | | | | | | |
| 15 | 28 | 20 | | | | | | | | | | | | | | | |
| 16 | 23 | | | | | | | | | | | | | | | | |

FIG. 18b 1504c 1506c 1500c 1502c

| RBG INDEX \ #RBGs | Throughput (Mbps) | | | | | | | | | | | | | | | | |
|---|---|---|---|---|---|---|---|---|---|---|---|---|---|---|---|---|---|
| | 1 | 2 | 3 | 4 | 5 | 6 | 7 | 8 | 9 | 10 | 11 | 12 | 13 | 14 | 15 | 16 | 17 |
| 0 | 2.92 | 4.54 | 5.69 | 7.68 | 9.07 | 7.68 | | | | | | | | | | | |
| 1 | 3.61 | 5.38 | 6.76 | 7.68 | 6.30 | | | | | | | | | | | | |
| 2 | 3.38 | 5.38 | 6.15 | 5.69 | | | | | | | | | | | | | |
| 3 | 3.84 | 4.92 | 4.31 | | | | | | | | | | | | | | |
| 4 | 3.15 | 3.23 | | | | | | | | | | | | | | | |
| 5 | 2.04 | | | | | | | | | | | | | | | | |
| 6 | | | | | | | | | | | | | | | | | |
| 7 | | | | | | | | | | | | | | | | | |
| 8 | | | | | | | | | | | | | | | | | |
| 9 | 4.15 | 5.38 | 6.76 | 8.15 | | | | | | | | | | | | | |
| 10 | 3.38 | 5.38 | 6.76 | | | | | | | | | | | | | | |
| 11 | 4.15 | 5.38 | | | | | | | | | | | | | | | |
| 12 | 3.38 | | | | | | | | | | | | | | | | |
| 13 | | | | | | | | | | | | | | | | | |
| 14 | | | | | | | | | | | | | | | | | |
| 15 | 4.15 | 4.92 | | | | | | | | | | | | | | | |
| 16 | 3.15 | | | | | | | | | | | | | | | | |

FIG. 18c

DETERMINATION OF AN UPLINK TRANSMISSION CONFIGURATION

The disclosure relates to an apparatus, and a method of operating an apparatus.

Communication circuitry is used to transfer information over a wireless communication link. The scheduling of uplink communications can affect the overall throughput of the wireless communication link.

In a first configuration there is provided an apparatus comprising:

- communication circuitry configured to receive information indicative of a quality of a wireless uplink connection; and
- scheduling circuitry configured to determine an uplink transmission configuration defining a subset of uplink resource blocks allocated to the wireless uplink connection, the subset of uplink resource blocks determined based on a simultaneous consideration of both of the quality of the wireless uplink connection and a power spectrum distribution of a total power budget across the uplink resource blocks,
- wherein the power spectrum distribution is non-uniform across the uplink resource blocks.

In a second configuration there is provided a method of operating an apparatus, the method comprising:

- receiving information indicative of a quality of a wireless uplink connection; and
- determining an uplink transmission configuration defining a subset of uplink resource blocks allocated to the wireless uplink connection, the subset of uplink resource blocks determined based on a simultaneous consideration of both of the quality of the wireless uplink connection and a power spectrum distribution of a total power budget across the uplink resource blocks,
- wherein the power spectrum distribution is non-uniform across the uplink resource blocks.

In a third configuration there is provided an apparatus comprising:

- means for receiving information indicative of a quality of a wireless uplink connection; and
- means for determining an uplink transmission configuration defining a subset of uplink resource blocks allocated to the wireless uplink connection, the subset of uplink resource blocks determined based on a simultaneous consideration of both of the quality of the wireless uplink connection and a power spectrum distribution of a total power budget across the uplink resource blocks,
- wherein the power spectrum distribution is non-uniform across the uplink resource blocks.

Figure 2:
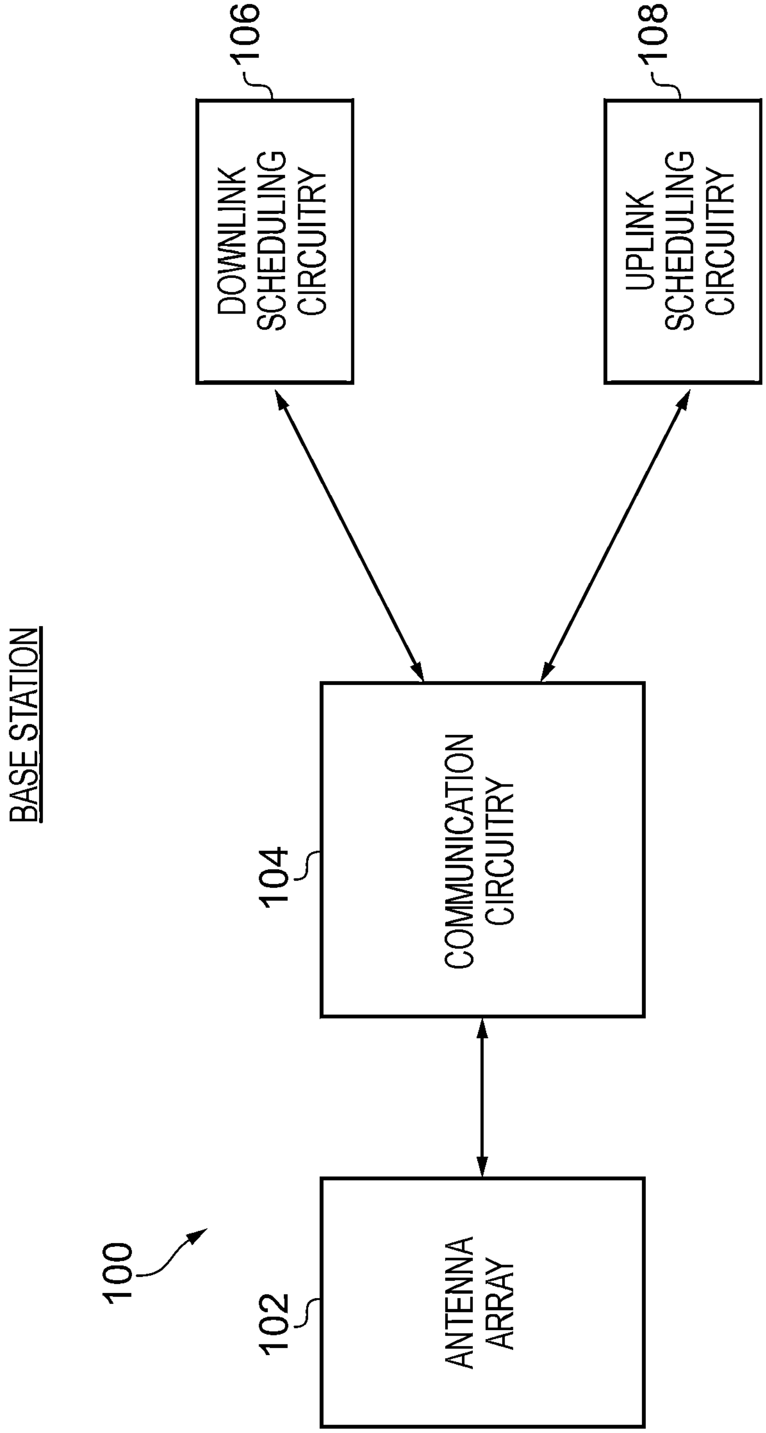
Figure 3:
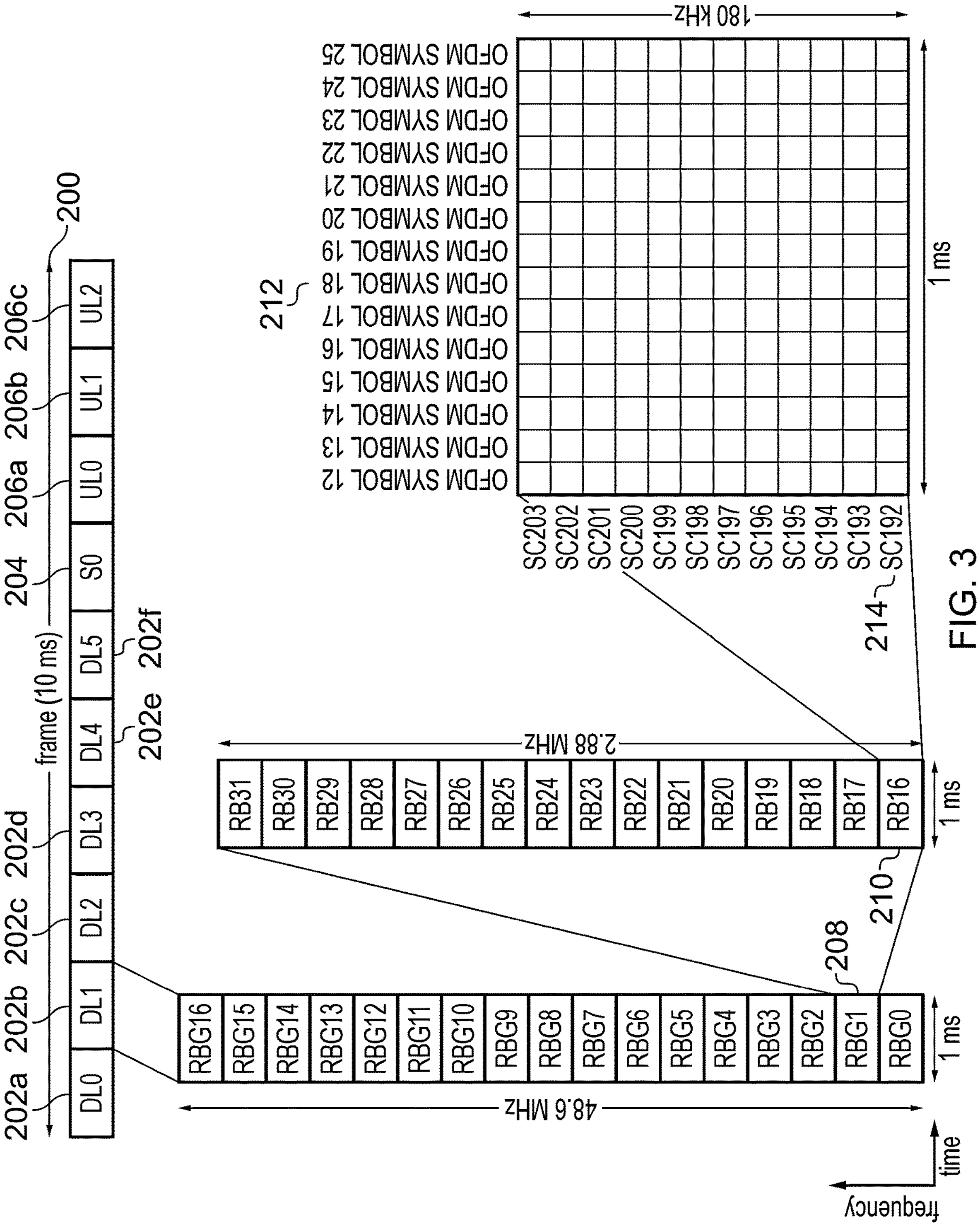
Figure 4:
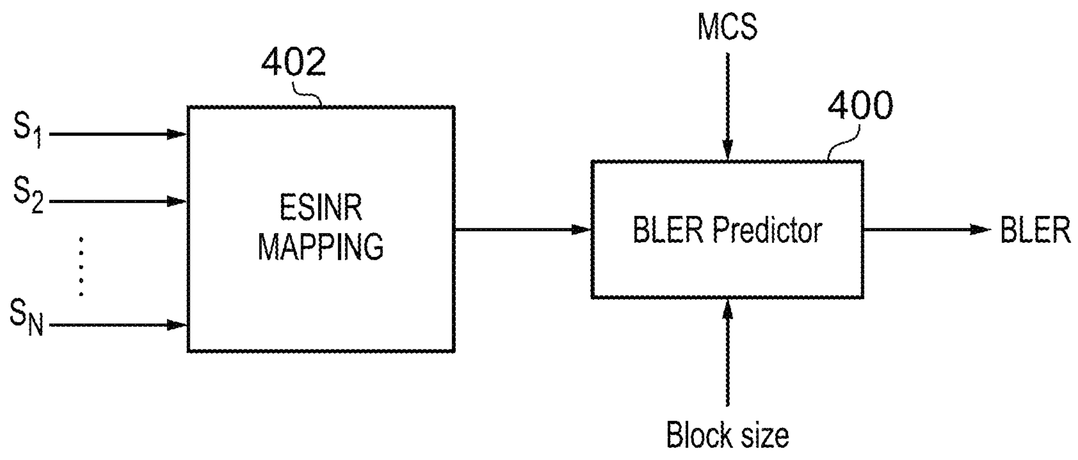
Figure 5:
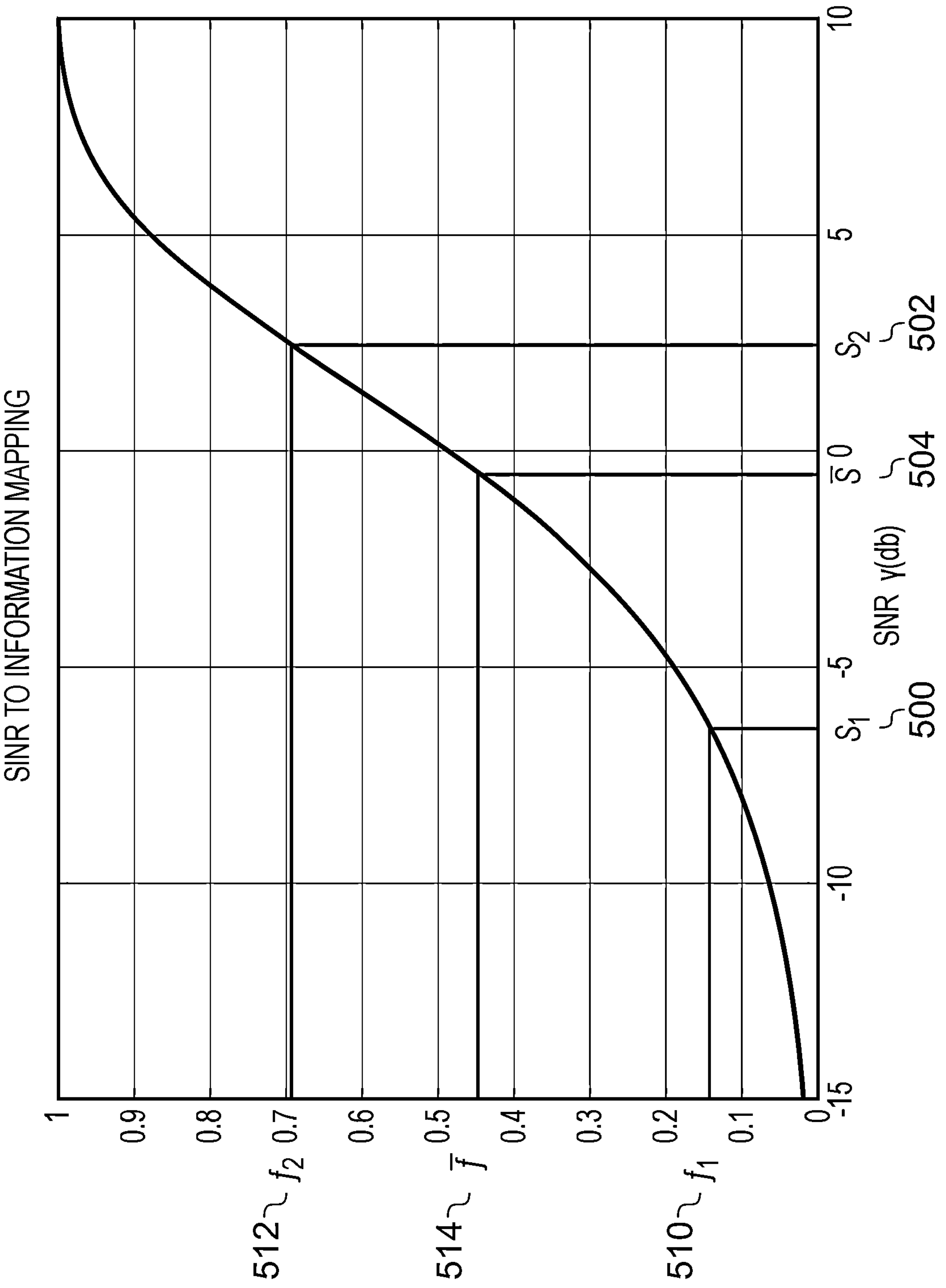
Figure 6:
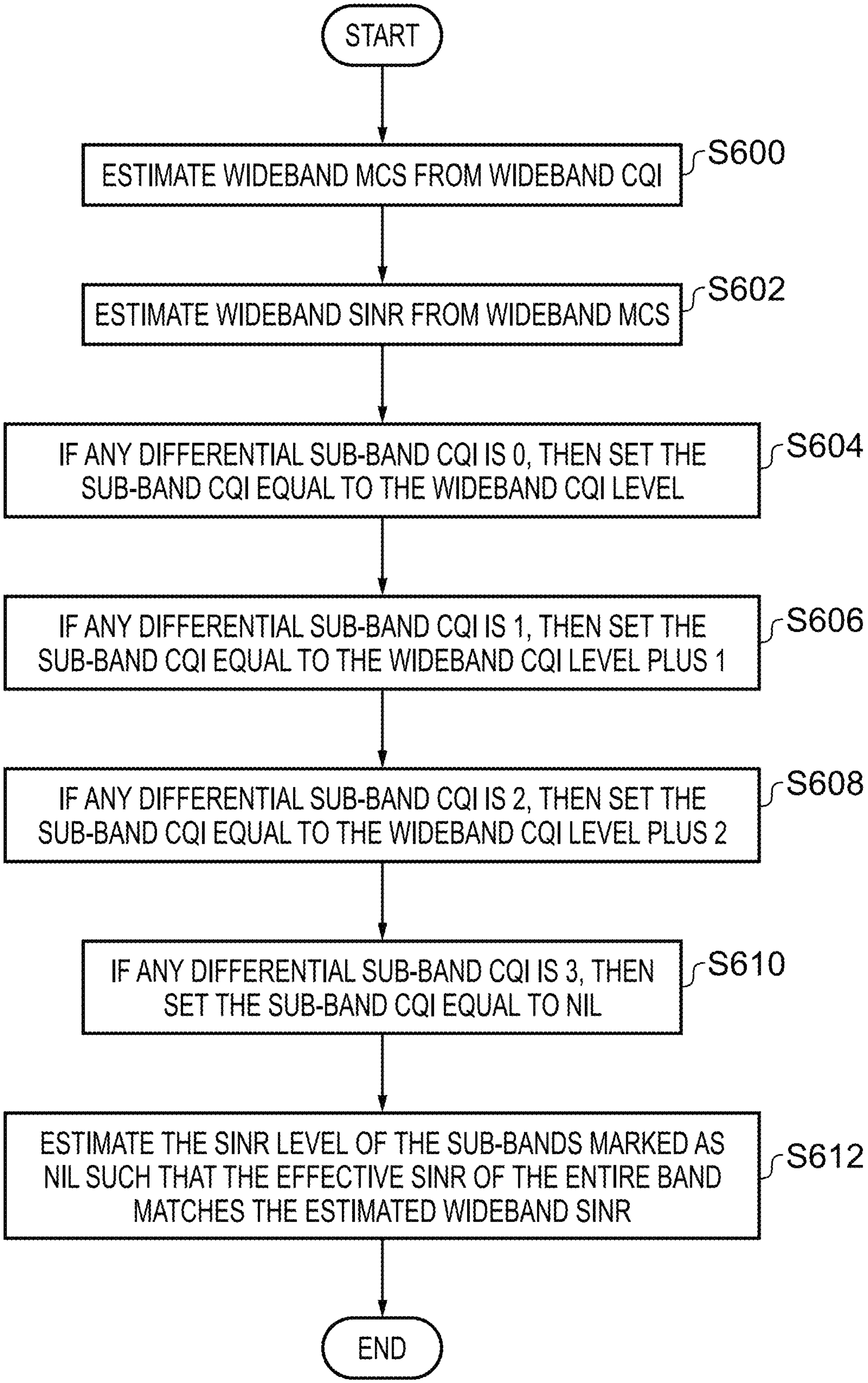
Figure 7:
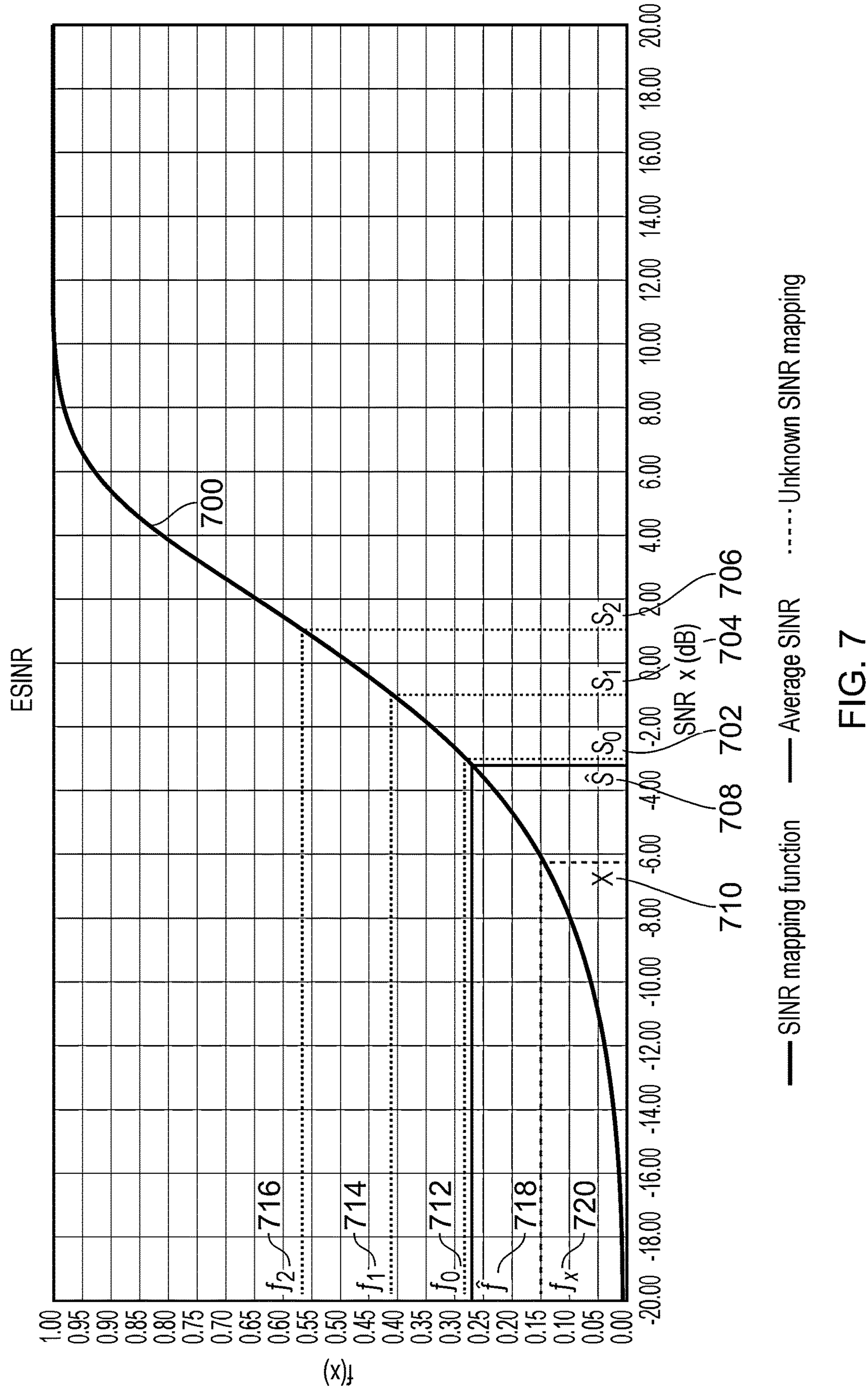
Figure 9:
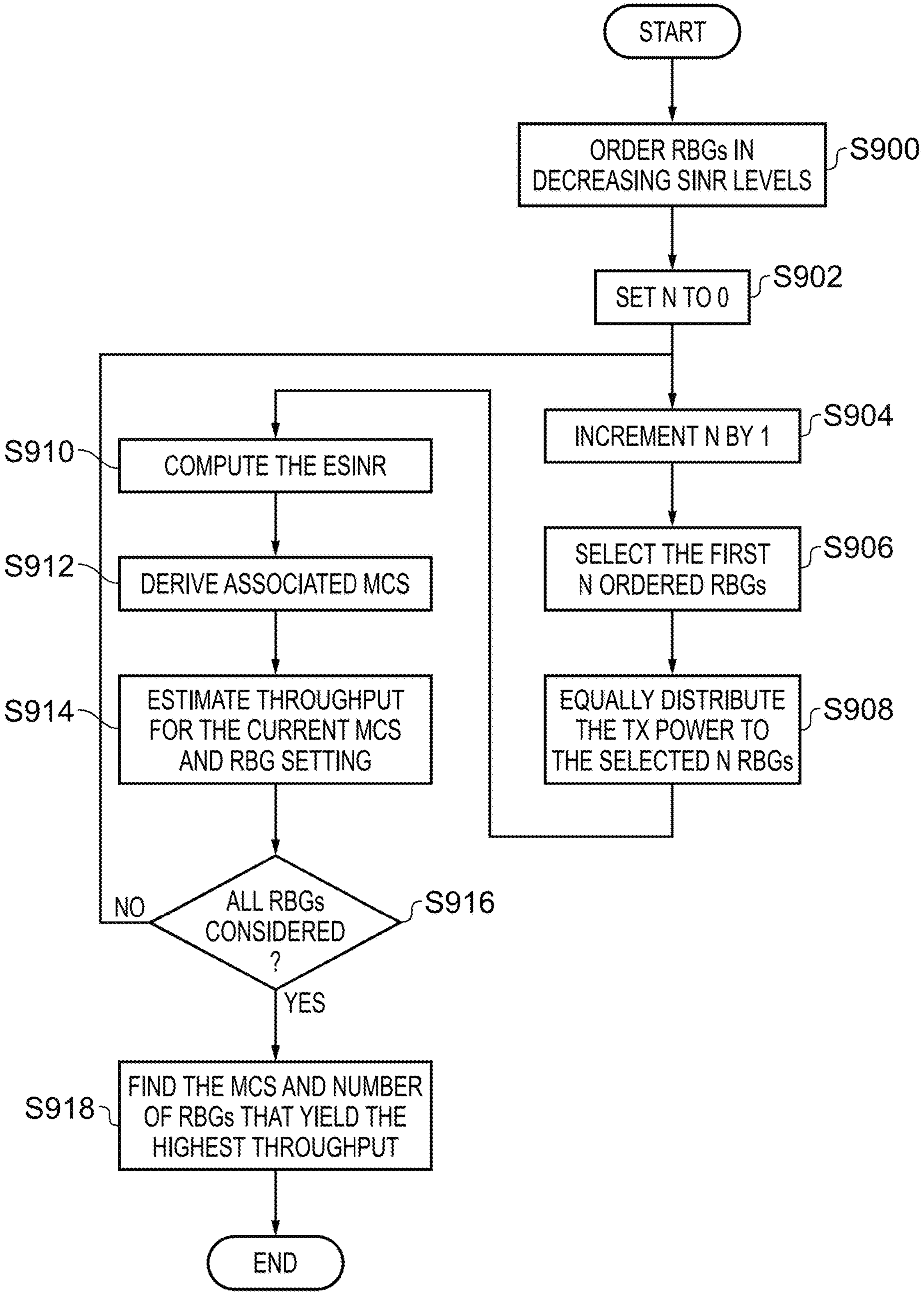
Figure 11:
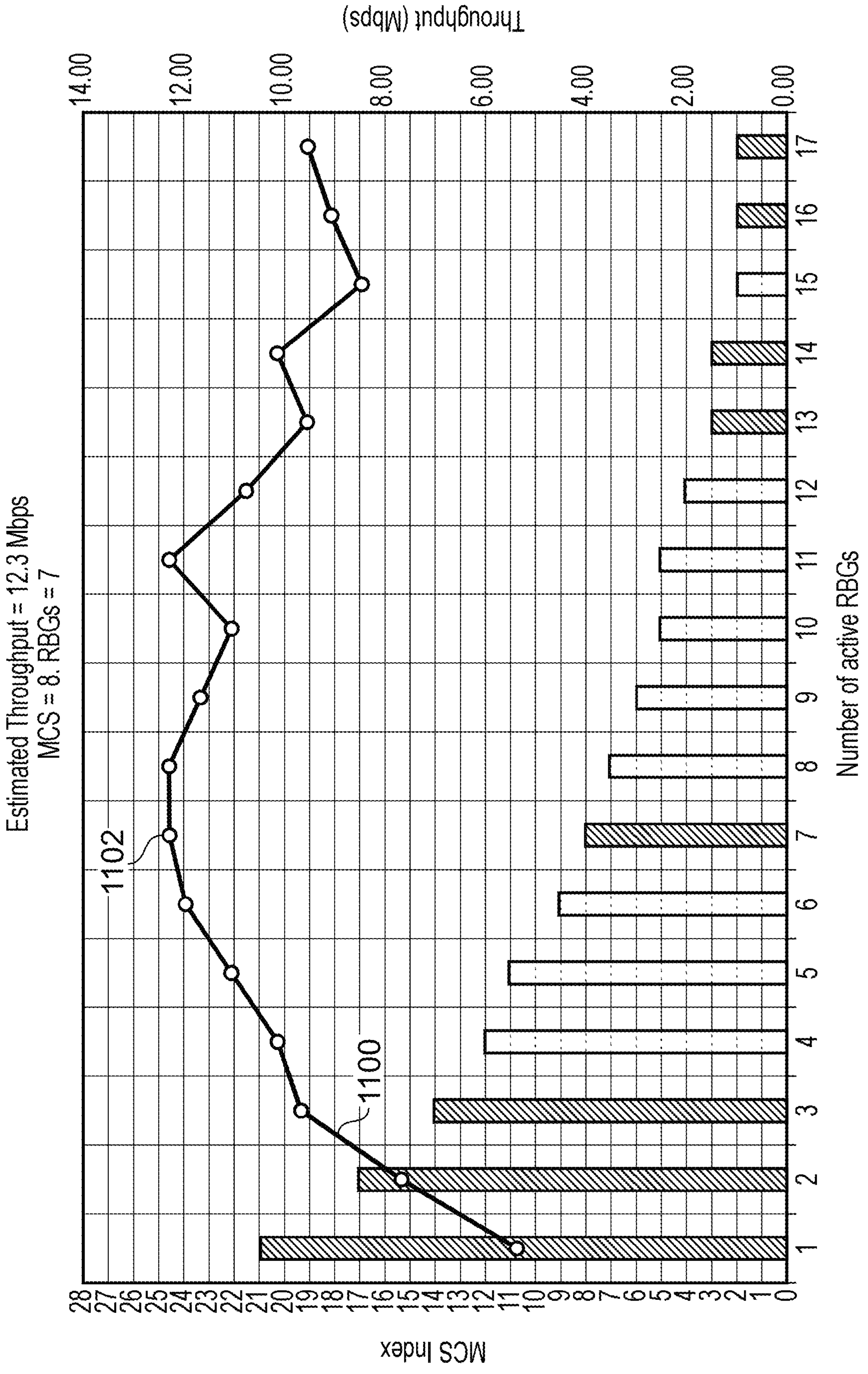
Figure 12:
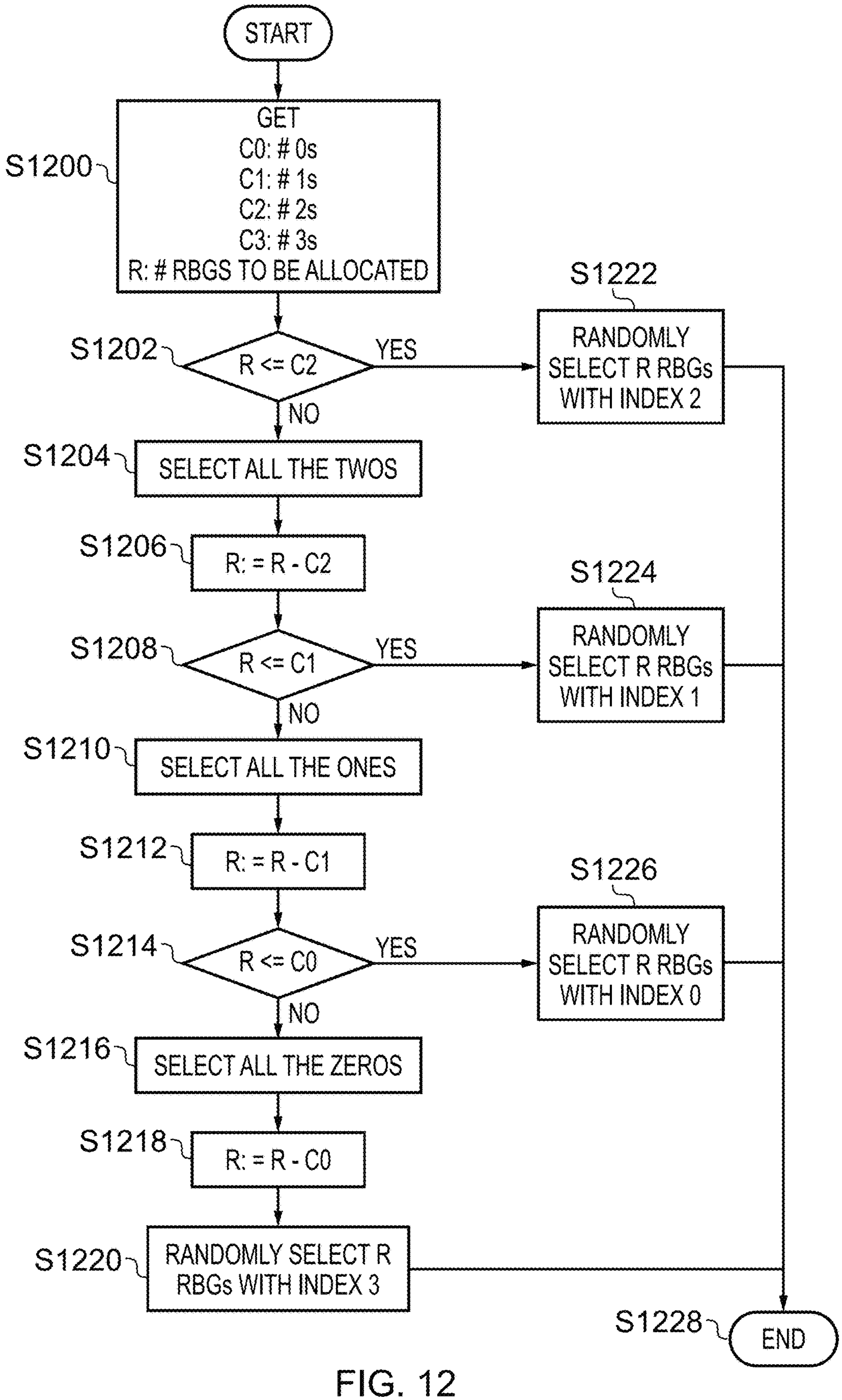
Figure 14:
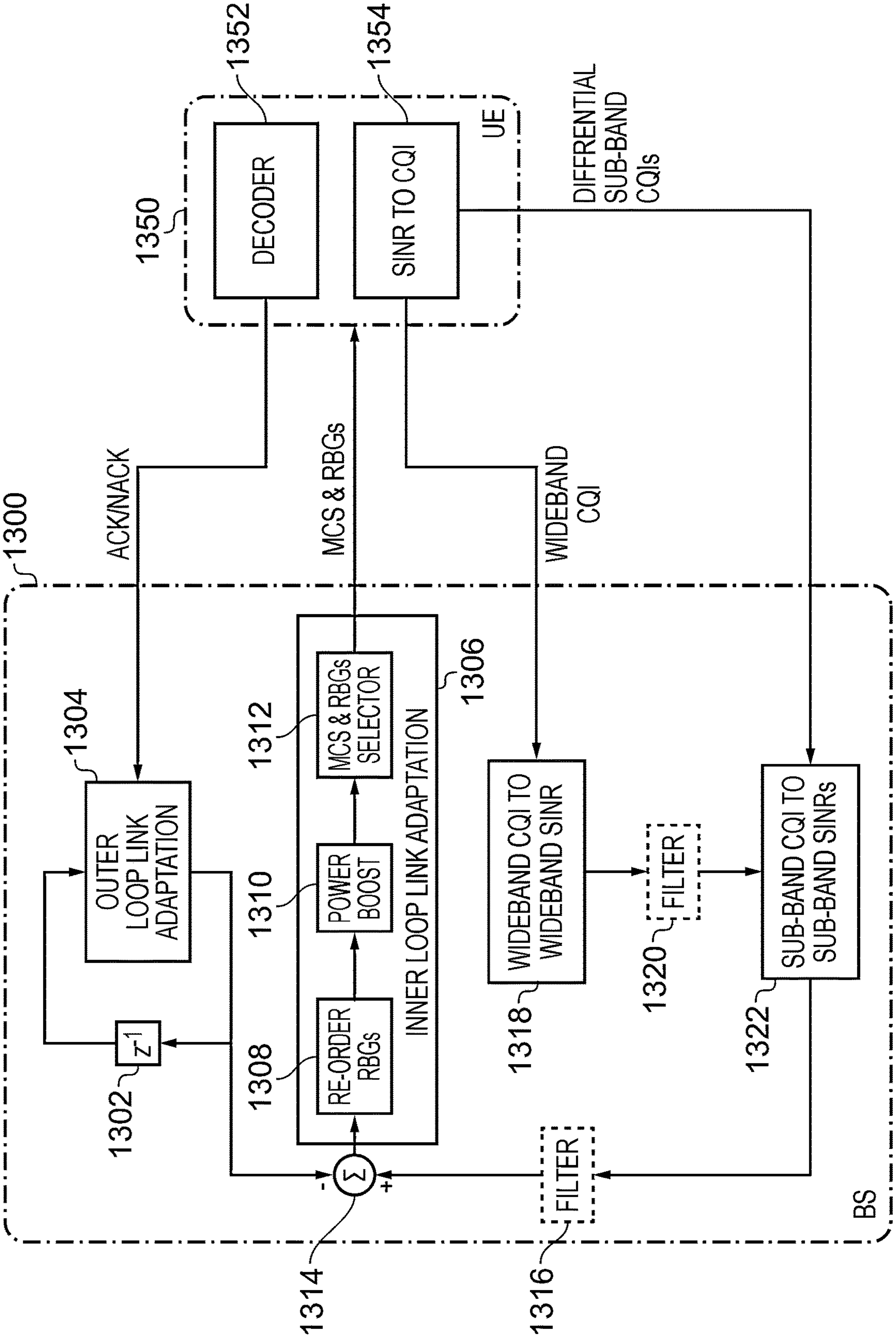
Figure 15:
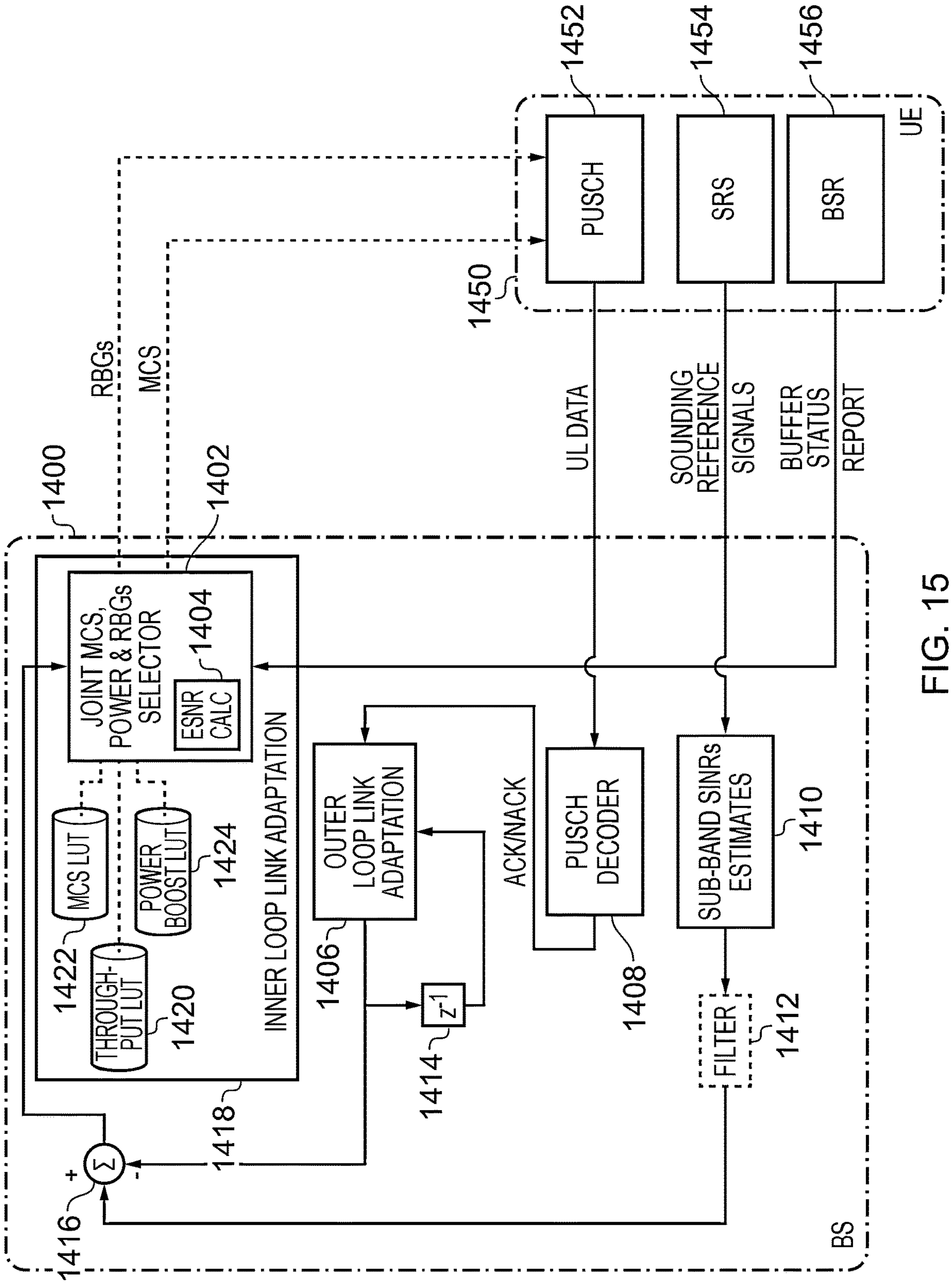
Figure 17:
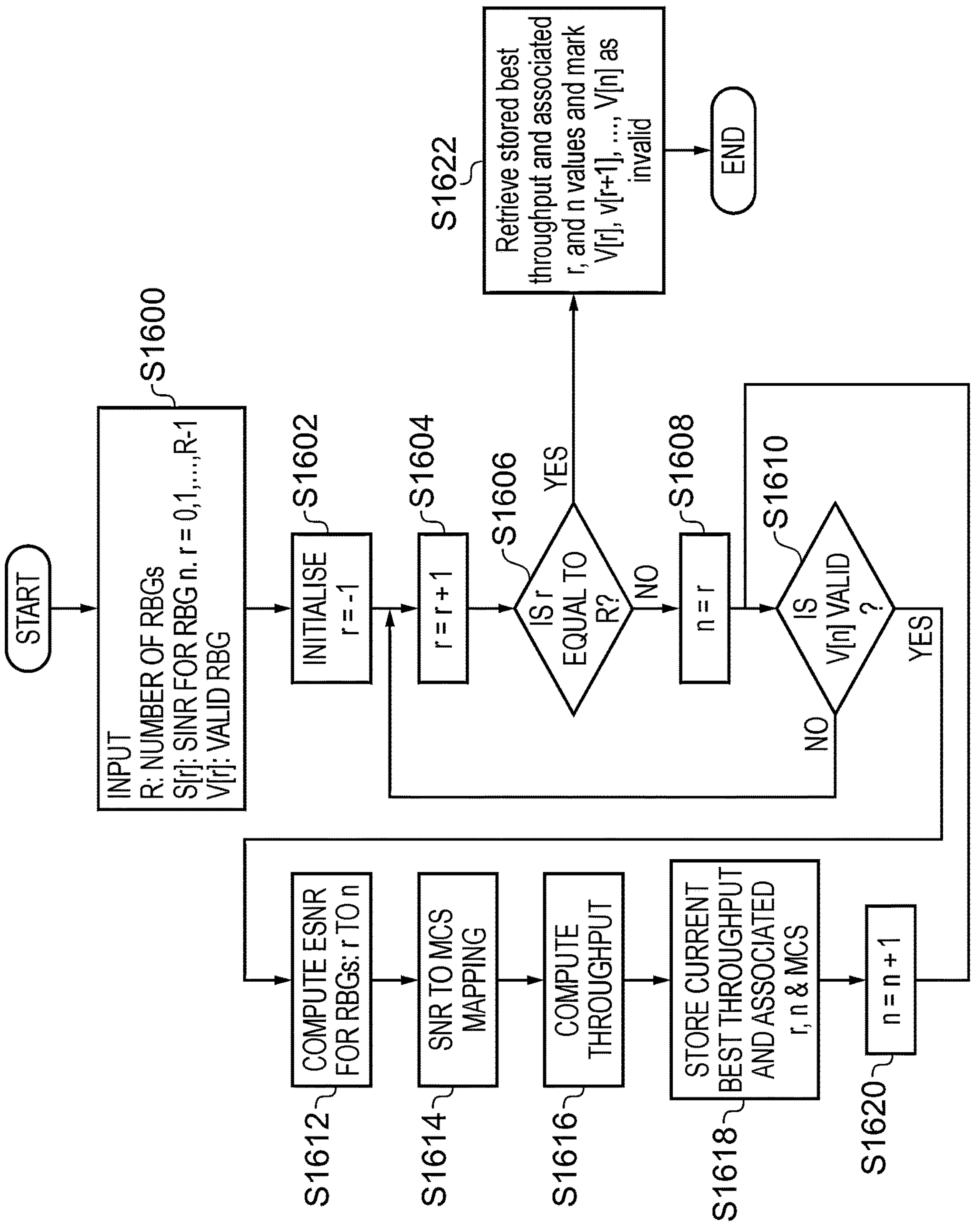
Figure 19:
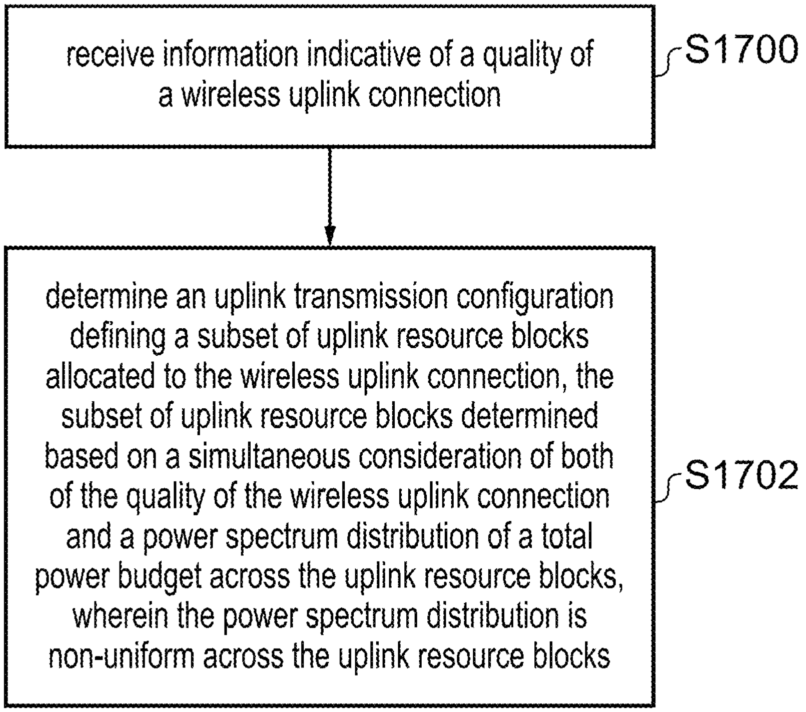

The present techniques will be described further, by way of example only, with reference to configurations thereof as illustrated in the accompanying drawings, in which:

FIG. 1 schematically illustrates an example application of an apparatus according to various configurations of the present techniques;

FIG. 2 schematically illustrates an apparatus according to various configurations of the present techniques;

FIG. 3 schematically illustrates the use of resource blocks in transmissions according to various configurations of the present techniques;

FIG. 4 schematically illustrates the prediction of a block error rate according to various configurations of the present techniques;

FIG. 5 schematically illustrates a mapping used for calculating an effective signal to interference and noise ratio according to various configurations of the present techniques;

FIG. 6 schematically illustrates a sequence of steps carried out by downlink scheduling circuitry according to various configurations of the present techniques;

FIG. 7 schematically illustrates a mapping used to determine an unknown signal to interference and noise ratio for downlink scheduling according to various configurations of the present techniques;

FIG. 8 schematically illustrates an example of determining an unknown signal to interference and noise ratio for downlink scheduling according to various configurations of the present techniques;

FIG. 9 schematically illustrates a sequence of steps carried out by scheduling circuitry to select resource block groups for downlink scheduling according to various configurations of the present techniques;

FIG. 10*a* schematically illustrates an example of selecting resource block groups for downlink scheduling according to various configurations of the present techniques;

FIG. 10*b* schematically illustrates an example of selecting resource block groups for downlink scheduling according to various configurations of the present techniques;

FIG. 11 schematically illustrates the dependence of MCS and throughput on a variation of a number of active resource block groups for downlink scheduling according to various configurations of the present techniques;

FIG. 12 schematically illustrates the determination of a subset of downlink resource block groups according to various configurations of the present techniques;

FIG. 13 schematically illustrates use of a lookup table to estimate SINRs based on a sub-band CQI;

FIG. 14 schematically illustrates an apparatus for downlink scheduling according to various configurations of the present techniques;

FIG. 15 schematically illustrates an apparatus for uplink scheduling according to various configurations of the present techniques;

FIG. 16 schematically illustrates an example of selecting resource block groups for uplink scheduling according to various configurations of the present techniques;

FIG. 17 schematically illustrates a sequence of steps carried out by scheduling circuitry for uplink scheduling according to various configurations of the present techniques;

FIG. 18*a* schematically illustrates an example of selecting resource block groups for uplink scheduling according to various configurations of the present techniques;

FIG. 18*b* schematically illustrates an example of selecting resource block groups for uplink scheduling according to various configurations of the present techniques;

FIG. 18*c* schematically illustrates an example of selecting resource block groups for uplink scheduling according to various configurations of the present techniques; and FIG. 19 schematically illustrates a sequence of steps carried out by scheduling circuitry for uplink scheduling according to various configurations of the present techniques.

Some configurations provide an apparatus comprising communication circuitry configured to receive information indicative of a quality of a wireless uplink connection. The apparatus is provided with scheduling circuitry configured to determine an uplink transmission configuration defining a subset of uplink resource blocks allocated to the wireless uplink connection. The subset of uplink resource blocks is determined based on a simultaneous consideration of both of the quality of the wireless uplink connection and a power spectrum distribution of a total power budget across the uplink resource blocks. The power spectrum distribution is non-uniform across the uplink resource blocks.

The apparatus is provided to control a configuration of an uplink transmission. In particular, uplink communications make use of a number of resource blocks with each resource block defining a usable subset of a time range and/or a frequency range that can be used by a specific device to transmit information as part of an uplink transmission. For each uplink there is a finite number of resource blocks that can be used and a predetermined power budget (for example, defined by a wireless communication standard) that can be used for that uplink transmission. The power budget is defined across the finite number of resource blocks. The inventors have realised that there is a trade off between the choice of resource blocks that are used for an uplink transmission and the power that is allocated to the resource blocks from the total power budget. For example, if the power budget is evenly distributed across all possible resource blocks then, due to unsolicited interference, it may be that the information loss in each resource block is too high and the communication efficiency goes down. On the other hand, if the entire power budget is allocated to a single resource block then, whilst that single resource block may achieve a high transmission quality, the total amount of information that is transferred is limited by the maximum information content of that resource block. The apparatus is provided with communication circuitry that is configured to receive information that is indicative of a quality of a wireless uplink connection. In some configurations the communication circuitry measures the quality of the wireless uplink connection based on a measurement of a reference signal that is received by the communication circuitry. In some configurations the reference signal is a Sounding Reference Signal (SRS) The apparatus is also provided with scheduling circuitry that is arranged to determine uplink transmission configurations. The scheduling circuitry and the communication circuitry may be provided as physically distinct blocks of circuitry or as a single block of circuitry that performs the functions of both the scheduling circuitry and the communication circuitry. The scheduling circuitry is arranged to define a subset of uplink resource blocks that are allocated to the wireless uplink transmission by considering both the quality of the wireless uplink connection and a power spectrum distribution simultaneously. The simultaneous consideration of the quality of the wireless uplink connection and a power spectrum distribution means that the subset of uplink resource blocks is selected based on both of these quantities which are considered within a same calculation. In considering the subset of uplink resource blocks, the scheduling circuitry is arranged to consider a non-uniform distribution of the total power budget across the uplink resource blocks. In some configurations, the simultaneous considerations includes the consideration of different possible non-uniform distributions of the power budget across the subset of resource blocks and knowledge of a current quality of the wireless uplink connection. Advantageously, this approach improves throughput by choosing the subset of uplink resource blocks based on the quality of the signal and the total power budget. For example, if the signal quality is poor, throughput may be increased by reducing a number of resource blocks in the subset of uplink resource blocks whilst increasing a power associated with each of the uplink resource blocks. On the other hand, where the signal quality is good, throughput may be increased by increasing the number of resource blocks in the subset of uplink resource blocks whilst decreasing the power associated with each of the uplink resource blocks.

The subset of uplink resource blocks can be defined as any of the resource blocks within a predefined time and frequency range. However, in some configurations the subset of uplink resource blocks are a contiguous subset of the uplink resource blocks. Some communication standards require that uplink resource block allocation is contiguous. By simultaneously considering the power spectrum distribution of the total power budget and the signal quality a particularly efficient solution can be provided that determines uplink resource block allocation taking into account resource blocks for which a particularly low connection quality is determined. For example, it may be determined that a maximum throughput can be obtained by defining the contiguous subset of uplink resource blocks such that they avoid a particular resource block for which a particularly low connection quality is reported.

Whilst the contiguous subset of uplink resource blocks can be contiguous in the time domain or the frequency domain, in some configurations the contiguous subset of the uplink resource blocks are contiguously allocated frequency ranges in a frequency domain. By selecting the contiguously allocated frequency ranges in the frequency domain, the scheduling circuitry is able to determine a configuration that uses portions of the frequency domain that are not in use by other devices in the neighbourhood of the apparatus which are likely to be prolonged sources of interference.

The uplink transmission configuration is not limited and, in addition to defining the subset of uplink resource blocks allocated to the wireless uplink connection, in some configurations the scheduling circuitry is configured to determine, as part of the uplink transmission configuration, modulation coding scheme information associated with the subset of uplink resource blocks; and the modulation coding scheme information is determined based on the simultaneous consideration of both of the quality of the wireless uplink connection and the power spectrum distribution of the total power budget across the uplink resource blocks. A modulation coding scheme relates to a number of bits of information that can be carried by a resource block. Typically, a higher modulation coding scheme index corresponds to a greater number of bits of information carried per resource block and a lower modulation coding scheme index corresponds to a lower number of bits of information carried per resource block. The choice of modulation coding scheme that is appropriate is dependent on a target minimum signal quality corresponding to a specific transmission error rate. In other words for a predefined transmission error rate there is a correspondence between the signal quality and the modulation coding scheme index. Hence, there is a need to carefully choose the modulation coding scheme in order to ensure that the signal quality does not decrease below the minimum signal quality. If the modulation coding scheme index is too high for a current signal quality, then the transmission error rate will increase and throughput will drop. On the other hand if the modulation coding scheme index is too low for a current level of signal quality then the resource blocks will be underutilized resulting in reduced communication throughput. The inventors have realised that the simultaneous consideration of the quality of the wireless uplink connection and the power spectrum distribution of the total power budget when determining the modulation coding scheme allows for an improved throughput. Hence, the scheduling circuitry is configured to calculate both of the subset of uplink resource blocks and the corresponding modulation coding scheme simultaneously. In this way the modulation coding scheme is tailored to the choice of the subset of uplink resource blocks based on the quality of the wireless uplink connection.

Whilst in some configurations the modulation coding scheme information and the subset of uplink resource blocks are calculated in parallel, in some configurations the scheduling circuitry is configured to determine the subset of uplink resource blocks based on the modulation coding scheme information. The determination can be based on an initial selection of modulation coding scheme information such that the subset of uplink resource blocks provides a greatest throughput for the selected modulation coding scheme. Alternatively, in some configurations, an iterative procedure is used to refine the selection of the modulation coding scheme based on an estimated throughput of the subset of uplink resource blocks that are selected based on an initial estimate of the modulation coding scheme.

In some configurations the scheduling circuitry is configured to select the uplink transmission configuration from a plurality of potential uplink transmission configurations each defining a corresponding contiguous subset of uplink resource blocks. For a given number of resource blocks that are available for allocation, there will be a finite number of possible combinations of contiguous resource block allocations. The scheduling circuitry is configured to calculate a potential uplink transmission configuration for at least a subset of all possible combinations. In some configurations the scheduling circuitry is configured to calculate a potential uplink transmission configuration for every possible contiguous combination of resource blocks.

The selection of one of the potential uplink transmission configurations by the scheduling circuitry can be determined based on a number of different factors. In some configurations the scheduling circuitry is configured to estimate, for each of the plurality of potential uplink transmission configurations, an uplink communication throughput based on a corresponding power spectrum distribution of the total power budget across the corresponding contiguous subset of uplink resource blocks; and the uplink transmission configuration is selected as one of the plurality of potential uplink transmission configurations having a highest estimated uplink communication throughput. By considering a plurality of potential uplink transmission configurations and selecting the potential uplink transmission configuration, from amongst the plurality of potential uplink transmission configurations, with the greatest throughput the total uplink throughput can be further improved. In other configurations the scheduling circuitry selects the uplink transmission configuration as the one with the highest modulation coding scheme resulting in a greatest density of transmitted information. In alternative configurations the scheduling circuitry is configured to select the uplink transmission configuration based on a predetermined number of resource blocks.

In some configurations the scheduling circuitry is further configured to estimate, for each of the plurality of potential uplink transmission configurations, the uplink communication throughput based on the modulation coding scheme information associated with the corresponding contiguous subset of uplink resource blocks. Typically, potential uplink configurations that use fewer resource blocks will have a higher modulation coding scheme because a greater portion of the total power budget can be allocated to those resource blocks. The resulting transmission is therefore likely to be higher quality and so there is less chance of transmission errors occurring. Less redundant or recovery information therefore needs to be included. Hence, a greater information density can be provided within a smaller number of resource blocks. However, a greater throughput may be achievable by using a lower modulation coding scheme but spreading the power budget over a greater number of resource blocks. Hence, there is often a non-monotonic relationship between the number of resource blocks that are allocated to the uplink transmission configuration and the total throughput. By calculating the throughput taking the modulation coding scheme into account, an improved estimate of the throughput can be obtained and an improved solution is achieved.

The information indicative of a quality of a wireless uplink connection can be defined as an average or a maximum value of the signal quality of each resource block across the whole range of resource blocks. In some configurations the information indicative of a quality of a wireless uplink connection comprises a plurality of signal to interference and noise ratios, each indicative of a reference signal associated with one of the uplink resource blocks of a wireless uplink signal received from a communication device by the wireless communication circuitry. In this way the scheduling circuitry is able to select an uplink transmission configuration tailored to the communication device that potentially avoids particular resource blocks for which there is a particularly poor signal to interference and noise ratio. In some configurations, the information indicative of a quality of the wireless uplink connection comprises a plurality of signal to noise ratios.

In some configurations the communication circuitry is configured to transmit the uplink transmission configuration to the communication device. In this way information can be provided to the communication device that enables the communication device to modify the subset of uplink resource blocks that it uses for a particular uplink communication and the modulation coding scheme that the communication device uses for that uplink communication.

The modulation coding scheme can be calculated in a variety of ways. In some configurations the modulation coding scheme is based on a maximum signal to interference and noise ratio of the plurality of signal to interference and noise ratios associated with the subset of uplink resource blocks. In some configurations the modulating coding scheme information is calculated based on a non-linear combination of the plurality of signal to interference and noise ratios associated with the subset of uplink resource blocks. Because signal to interference and noise ratios are expressed on a logarithmic scale any measurement that is based on a combination of a number of the plurality of signal to interference and noise ratios should be designed to compensate for the non-linearity of the logarithmic scale. Hence, using a non-linear combination of the plurality of signals provides a more consistent approach to calculating the modulation coding scheme.

In some configurations the non-linear combination comprises converting each of the plurality of signal to interference and noise ratios to a resulting value on a linear scale and averaging the resulting values. The resulting averaged value can then be converted back to the logarithmic scale to determine an average signal to interference and noise ratio. The modulation coding scheme can then be calculated on the basis of the average signal to interference and noise ratio. The method by which each of the plurality of signal to interference and noise ratios is converted to the resulting value on the linear scale can be variously defined. In some configurations a lookup table can be provided to perform the conversion. This approach is particularly efficient computationally. In some alternative configurations processing circuitry can be provided to convert between the signal to interference and noise ratios and the linear scale. This approach can be more accurate as it avoids any coarse graining that might result from using a lookup table to perform the conversion. In further alternative configurations, an iterative approach can be used to sequentially determine an average signal to interference and noise ratio for each of the subset of uplink resource blocks based on a previously calculated average signal to interference and noise ratio associated with a further subset of uplink resource blocks, where the further subset of resource blocks is contained in the subset of resource blocks.

In some configurations the communication circuitry is configured to receive information indicative of an uplink communication event, and wherein the apparatus further comprises correction circuitry configured to modify the information indicative of the quality of the wireless uplink connection by a correction factor based on the information indicative of the uplink communication event. The information indicative of the quality of the wireless uplink connection is modified by the correction factor before being passed to the scheduling circuitry. The information indicative of an uplink communication event can be any received information that requires a modification of the quality of the wireless uplink connection by the correction factor. In some configurations the information indicative of the uplink communication event is information that indicates a communication success of the uplink transmission or information that indicates a communication failure of the uplink transmission. This mechanism provides a feedback loop that allows for artificial modification of the information indicative of the quality of the wireless uplink connection and can be used to improve the throughput of the uplink connection.

In some configurations the information indicative of the quality of the wireless uplink connection is a signal to interference and noise ratio and the correction factor is added to the signal to interference and noise ratio. In this way the signal to interference and noise ratio that is used to perform the scheduling can be artificially increased, with respect to the signal to interference and noise ratio that is measured, in response to a communication event.

In some configurations the correction factor is dynamically selected in order to achieve a predetermined block error rate. The block error rate is a measurement of a rate at which blocks are received in error. Typically, the block error rate defines a maximum allowable rate of error for the received blocks. However, by providing the correction factor as a feedback mechanism, an increased throughput can be achieved whilst maintaining a block error rate that is typically less than or equal to the predetermined block error rate.

In some configurations the correction factor is decreased by a downward correction factor in response to the information indicative of the uplink communication event indicating a communication success; and the correction factor is increased by an upwards correction factor in response to the information indicative of the uplink communication event indicating a communication failure. When the block error rate is below the predetermined block error rate, more blocks will be received successfully. Hence, the downward correction factor is used and the correction factor is reduced resulting in a lower modified signal to interference and noise ratio. As a result, the scheduling circuitry is likely to select a higher modulation coding scheme or a different subset of the uplink resource blocks. This, in turn, will increase the throughput of the system but will potentially increase the number of communication failures. When the block error rate is above the predetermined block error rate, there will be an increase in communication failures. Hence, the upward correction factor is used and the correction factor is increased resulting in a higher modified signal to interference and noise ratio. As a result, the scheduling circuitry is likely to select a lower modulation coding scheme or a different subset of the uplink result blocks. This, in turn, will decrease the throughput of the system and will reduce the number of communication failures. This dynamic procedure results in a communication scheme where throughput is adjusted such that the block error rate is approximately equal to the predetermined block error rate. In some configurations the information indicating a communication success is an acknowledgement signal (ACK) and the information indicating a communication failure is a negative acknowledgement signal (NACK).

In some configurations the upwards correction factor is greater than the downwards correction factor. In this way, an increase in a frequency of communication failures results in a more rapid response from the scheduling circuitry than in the case of a decrease in the frequency of communication failures. As a result the apparatus is able to reduce a frequency at which the block error rate exceeds the predetermined block error rate.

In some configurations a ratio of the upwards correction factor and the downwards correction factor is selected in order to achieve the predetermined block error rate. Because the number of modifications of the correction factor based on the upwards correction factor and the downwards correction factor is determined based on the actual block error rate, the upwards correction factor and the downwards correction factor are assigned a specific ratio in order to achieve the predetermined block error rate. The block error rate (BLER) target is achieved by adjusting the current correction factor $\bar{\gamma}_k$ downwards by the downwards correction factor $\Delta^{down}$ upon the reception of a communication success (ACK), and upwards by the upwards correction factor $\Delta^{up}$ upon the reception of a communication failure (NACK). Thus, given the correction term $\bar{\gamma}_{k-1}$ on slot k−1, the correction term $\bar{\gamma}_k$ on a given uplink transmission k is given $$\bar{\gamma}_k=\bar{\gamma}_{k-1}+n_k\Delta^{up}+(n_k-1)\Delta^{down}$$

where $n_k$ may take two vales, either 0 or 1. If a NACK was received on uplink transmission k, then $n_k=1$. Alternatively, if an ACK was received on uplink transmission k, then $n_k=0$. In order to maintain a particular block error rate, the difference in the correction terms $\bar{\gamma}_k$ and $\bar{\gamma}_{k-1}$ must be zero when summed over a large number of transmissions. Hence, the block error rate is defined as $$\overline{BLER}=(1+\Delta^{up}/\Delta^{down})^{-1}$$

which defines the ratio of the upwards correction factor to the downwards correction factor. As a result the downwards correction factor can be defined in terms of the upwards correction factor:

$$\Delta^{down}=\Delta^{up}\frac{\overline{BLER}}{1-\overline{BLER}}.$$

In some configurations the power spectrum distribution comprises a non-zero power allocated to the subset of uplink resource blocks and zero power allocated to a further subset of the uplink resource blocks, and the further subset of the uplink resource blocks and the subset of the uplink resource blocks are mutually exclusive subsets. The scheduling circuitry therefore selects the subset of uplink resource blocks which are allocated a non-zero power allocation. Resource blocks that do not form part of the subset of uplink resource blocks are allocated zero power of the total power budget.

In some configurations the non-zero power is dependent on a size of the subset of the uplink resource blocks. In some configurations the non-zero power that is allocated to the subset of uplink resource blocks is split evenly between each of the subset of uplink resource blocks. In other configurations the non-zero power is distributed between the resource blocks in a non-uniform way, for example, based on the information indicative of the quality of the uplink connection.

The following configurations might also be of relevance.

In accordance with one example configuration there is provided an apparatus comprising: communication circuitry configured to receive information indicative of quality of a wireless downlink connection; scheduling circuitry configured to determine a subset of downlink resource blocks allocated to the wireless downlink connection based on the quality of the wireless downlink connection and a spectrum distribution of power across the downlink resource blocks; and power control circuitry configured to allocate a budget of the power to the subset of downlink resource blocks according to the spectrum distribution of the power, wherein the spectrum distribution of the power is non-uniform across the downlink resource blocks.

In previous proposals (such as in LTE), the downlink power distribution is equally spread and fixed across the available spectrum. Downlink resource blocks not used to perform downlink can result in wasted power. One solution to this is to simply make use of all downlink resource blocks. However, this can result in a smaller signal to interference plus noise ratio that actually reduces the overall throughput. In the above examples, power can be distributed unevenly. For instance, the power budget might be distributed among a small subset of all of the downlink resource blocks. In this way, it is possible to make use of the entire power budget while limiting the impact of interference. This is achieved by providing information about the downlink connection to the apparatus (which might take the form of a base station for instance). The apparatus then makes scheduling decisions by determining which downlink resource blocks should be used, taking into account the overall power budget that can be distributed across some or all of those resource blocks. The resulting schedule is then implemented.

In some examples, the quality information comprises an average quality across the downlink resource blocks and a deviation from the average quality for each of the downlink resource blocks. In this way, it is possible to express at least an estimate of the quality of the downlink resource blocks efficiently. There are a number of ways in which the deviation can be expressed, depending on the number of bits that are provided for such an expression. However, in some embodiments, a pair of bits is provided for each resource block to illustrate whether a particular resource block is the same, one more, at least two more, or at least one less than the expressed average.

In some examples, the information indicative of a quality of a wireless downlink connection is based on a Channel State Information value for the wireless downlink connection. The Channel State Information value expresses the quality with which a particular signal is received. In these examples, a device receives a downlink signal from the apparatus, and the signal quality of that signal is measured and then reported back to the apparatus (e.g. as part of an uplink signal). In some example, the Channel State Information (CSI) is a Channel Quality Indicator (CQI).

In some examples, the information indicative of a quality of a wireless downlink connection is a quantised indicator of signal quality. Consequently, rather than providing a raw signal quality value, for example a Signal to Interference plus Noise Ratio (SINR) the signal quality value might be quantised. Quantisation can be thought of as the process of 'bucketing' values. Rather than providing the true value, the value is placed into the closest 'bucket'. The quality is thus provided in a less expressive manner. However, this decreased expressiveness can be achieved using a smaller number of bits, and thus fewer bits are required in order to transmit the quality of the wireless downlink. In some examples, the quantization goes beyond mere floating point rounding. For instance, in some examples, the quantization could be the provision of a CQI that is expressed as an integer. Typically, 16 discrete levels are used to signal the CQI. In some examples, the quantization is such that certain 'buckets' cover different ranges. For instance, some 'buckets' may be 'less than' or 'greater than' particular values. In some examples, the quantization is such that each resource block is expressed as one of four possible values, using two bits for each resource block.

In some examples, the scheduling circuitry comprises: ordering circuitry configured to generate a downlink resource block ordering by ordering the downlink resource blocks according to the quality information; and the subset of downlink resource blocks are contiguous in the downlink resource block ordering. The downlink resource blocks are therefore ordered (e.g. in order of descending quality) and a contiguous subset of those blocks are allocated for the downlink to proceed with. That is, it is possible to allocate the highest quality resource block or the two highest quality resource blocks, but not the highest and lowest quality resource blocks (unless all resource blocks with intervening qualities are also allocated).

In some examples, the scheduling circuitry comprises: SNR estimation circuitry configured to generate an estimated signal-to-noise-ratio assuming that the power budget was distributed to each candidate subset of downlink resource blocks. A candidate subset of the downlink resource blocks, which is a candidate for the subset of resource blocks to which the power budget is to be allocated, has an estimated signal-to-noise ratio generated, which is estimated on the assumption that the power budget will be fully expended on those candidate resource blocks.

In some examples, the estimated signal-to-noise-ratio is an effective signal-to-noise-ratio that is generated by performing an addition operation on a set of representative values for the estimated signal-to-noise ratio of each downlink resource block, which can be combined without compensating for the non-linear nature of units of signal-to-noise ratio. Signal-to-noise ratio may be calculated using decibels, which is an exponential scale. As a consequence, it is not possible to merely linearly add a number of signal-to-noise ratio values in a linear manner. Instead, the current examples use a lookup table or equation to convert the signal-to-noise ratios into effective signal-to-noise ratios, where linear addition is possible. In this way it is possible to calculate an average or to perform a straightforward algebraic calculation to determine a worst case estimate where the quality information is not accurately known. For instance, if quantisation of the downlink connection quality indicates that a particular downlink resource block is "at least one decibel lower than the average" then if the average connection quality is known, it is possible to determine an average worst case scenario for that resource block through by treating the distance below the average as an unknown to be solved. This, however, can be performed significantly more easily if an effective signal-to-noise ratio is considered, for which the values can be linearly manipulated.

In some examples, the scheduling circuitry comprises: modulation and coding scheme selection circuitry configured to determine a modulation and coding scheme to be used with a candidate subset of downlink resource blocks based on a desired error rate of the downlink resource blocks. The modulation and coding scheme that is used may include the sending of redundant or error correction information in it. The lower the desired error rate (when a particular bit cannot be deciphered) the more redundant information must be transmitted to enable a bit to be recovered when it is not transmitted properly. The modulation and coding scheme that is used may include the sending of the number of constellation points. The lower the desired error rate the fewer number of constellation points are transmitted to enable a bit to be recovered when it is not transmitted properly.

In some examples, the scheduling circuitry comprises: throughput estimation circuitry configured to estimate a throughput for each candidate subset of downlink resource blocks. Once the modulation and coding scheme is known and once the signal-to-noise ratio is known, it is possible to estimate the throughput that can be achieved on the downlink connection.

In some examples, the subset of downlink resource blocks is selected as the candidate subset of downlink resource blocks having a highest throughput. As previously expressed, the candidate set of downlink resource blocks may be a contiguous block of resource blocks in the ordered list of resource block qualities. Regardless, having determined the expected throughput from the subset of downlink resource blocks, the candidate subset that would produce the largest throughput for the downlink is selected. Note that outside the ordered list of resource blocks, those of the resource blocks that are allocated need not be contiguous. For instance, in the domains that define the resource blocks (e.g. frequency and/or time) the allocated resource blocks need not be contiguous.

In some examples, the scheduling circuitry and the power control circuitry are configured to determine the subset of downlink resource blocks and to allocate the budget of the power to the subset of downlink resource blocks to one item of user equipment from a plurality of items of user equipment at a time. That is, the allocation and the decision of which blocks are allocated are made for only one user at once. The allocation decision does not depend on what can be simultaneously achieved with multiple users.

In some examples, the downlink resource blocks are provided in respect of a single same configuration of a beam of the communication circuitry. That is, the scheduling circuitry does not consider alternative configurations of a beam used to determine the subset of downlink resource blocks. In some embodiments, the beam configuration might be controlled in order to change the wireless downlink connection and then the scheduling circuitry may be used to determine, using that wireless downlink connection, the downlink resource blocks that are to be allocated for the downlink to occur.

In some examples, the power budget is fixed according to a regulatory restriction. Particular jurisdictions may place limits on the power with which a transmission may occur. In these examples, the power budget is limited in that particular manner. The power budget cannot, therefore, be arbitrarily increased in these examples.

In some examples, the information indicative of quality of a wireless downlink connection is received from an item of user equipment. The item(s) of user equipment could themselves use the downlink connection or could have their own downlink connections (e.g. that have already been formed).

In some examples, the wireless downlink connection is a wireless downlink of the item of user equipment. The items of user equipment are therefore configured to connect to the apparatus and to receive information using the downlink connection.

In some examples, the spectrum distribution of the power is non-uniform across the downlink resource blocks such that at least some of the downlink resource blocks are allocated no power and at least some other of the downlink resource blocks are allocated non-zero power. Across the resource blocks that have been allocated power, each resource block may be allocated an equal share of the power budget.

Particular embodiments will now be described with reference to the figures.

The apparatus for which the techniques described herein can be utilised can take a variety of forms. For instance, the apparatus could be a base station that communicates with a hand held radio device that can be carried by a pedestrian or in a vehicle. Alternatively, the apparatus could be a base station configured to communicate with user equipment 12 mounted on a vehicle. The vehicle could take a variety of forms. For example, the techniques could be applied in respect of trains, where the base stations may be spread out along a region relatively close to the track. However, for the purposes of the examples discussed herein, it will be assumed that the vehicle is an aircraft, such as the airplane 10 shown in FIG. 1. The user equipment (UE) 12 on the airplane 10 is able to communicate with a base station 20 which may be one of a network of base stations provided to enable the aircraft 10 to connect to different base stations during a flight in order to seek to maintain a communication link that can be used to provide connectivity to passengers in the aircraft.

The apparatus described herein, which may take the form of the base station 20, may be arranged to perform scheduling for an uplink transmission and/or a downlink transmission. The uplink transmission is a transmission from the user equipment 12 to the base station 20 and the downlink transmission is a transmission from the base station to the user equipment 12.

FIG. 2 schematically illustrates a base station 100 configured for wireless communication with a plurality of terminals (not shown). The base station 100 includes an antenna array 102, which is arranged to generate a plurality of beams to transmit and receive signals from the plurality of terminals, under the control of wireless communication circuitry 104. In particular, the wireless communication circuitry 104 controls the antenna array 102 to transmit information (referred to as downlink transmissions) to the plurality of terminals on one or more transmission beams, and to receive information (referred to as uplink transmissions) transmitted by the plurality of terminals on one or more reception beams.

The transmission beams and reception beams are directional, so that they are only visible to terminals in a given direction (e.g. within a given angular range, the width of the range being dependent on how broad the beam is)—e.g. a transmission beam is considered to be "visible" to a given terminal if data transmitted using the transmission beam can be received by the terminal's antenna circuitry, and a reception beam is considered to be "visible" to the given terminal if the base station can receive data, transmitted by the terminal, on the reception beam. The number of beams which can be used at any given time by the antenna array may be limited based on hardware constraints associated with the specific circuitry of the base station 100, and/or due to certain regulatory constraints, some jurisdictions may require that the number of transmission beams (downlink beams) in operation at any given time be limited to a certain number. In some cases, regulatory constraints may limit the number of beams further (e.g. to a lower number) than the hardware constraints.

The antenna array 102 is made up of a plurality of antenna elements, and the base station 100 may further comprise beamforming circuitry (not shown) to generate the one or more reception and transmission beams, and beam steering circuitry (not shown) to steer (e.g. rotate) the beams.

The wireless communication circuitry 104 controls the antenna array 102 to communicate with the plurality of terminals in predetermined time slots each of which comprises plural resource block groups. In particular, the antenna array transmits downlink data to the one or more terminals in transmission time slots (also referred to as downlink slots or transmission slots) and does not transmit data during reception time slots (also referred to as uplink slots or reception slots), which are instead reserved for reception of uplink transmissions that are transmitted by the one or more terminals.

Accordingly, since both the number of beams that can operate at a given time and the time slots during which the base station can transmit or receive information are limited, there is a need to determine a schedule for when each of the plurality of terminals will transmit and receive data, and to determine the wireless communication resources (e.g. including which beam) to be employed for communication with each terminal. This is particularly the case when there are a large number of terminals in communication with a single base station, especially if these terminals are spread out such that they cannot all be reached by a limited number of beams.

Hence, the base station 100 of FIG. 2 also includes downlink scheduling circuitry 106 and uplink scheduling circuitry 108. The downlink scheduling circuitry 106 is arranged to perform a downlink scheduling process to determine downlink data allocations indicating, for a given downlink slot, which terminals the base station will transmit downlink data to and which wireless resources will be used to transmit the downlink data. Similarly, the uplink scheduling circuitry 108 is configured to perform an uplink scheduling process to determine uplink data allocations indicating, for one or more uplink slots, which terminals the base station expects to receive uplink information from, and which wireless resources it expects to be used. Downlink scheduling processes and uplink scheduling processes which may be employed by the downlink scheduling circuitry and the uplink scheduling circuitry are described below.

It will be appreciated that, while the uplink scheduling circuitry 108 and the downlink scheduling circuitry 106 are shown in FIG. 2 as being separate, in alternative configurations, it is also possible for a single set of scheduling circuitry to perform both the downlink scheduling process and the uplink scheduling process. Furthermore, in some configurations the base station may employ both downlink and uplink scheduling according to the disclosed techniques and, in alternative configurations, the base station may employ only one of downlink or uplink scheduling according to the disclosed techniques and may perform the other of the downlink or uplink scheduling alternative or previously known techniques.

The downlink data allocations and the uplink data allocations are communicated to the terminals in the form of control information—in particular, the control information includes information indicating the downlink data allocations and information indicating the uplink data allocations. The control information—indicating both downlink and uplink data allocations—is generated by the downlink scheduling circuitry 106 and the uplink scheduling circuitry 108 respectively and transmitted by the antenna array as part of the downlink data.

As noted above, the base station 100 is configured to communicate with the plurality of terminals in predetermined transmission time slots (downlink slots) and reception time slots (uplink slots). FIG. 3 shows an example of how these time slots may be arranged within a time period referred to as a frame. In the example of FIG. 3, the uplink slots and downlink slots are separated in time using the technique of Time Division Duplex (TDD). In alternative examples an alternative duplex scheme may be used. For example the uplink slots and the downlink slots may be separated in frequency employing Frequency Division Duplex (FDD). In the FDD case, a downlink frame comprises only downlink slots, and the uplink frame comprises only uplink slots.

In the example of FIG. 3, a frame 200 is a 10 ms time period and is divided into ten slots. In particular, the ten slots in this example comprise six downlink slots 202*a*-202*f*, three uplink slots 206*a*-206*c* and one special/reserved slot 204. The downlink slots represent periods of time during which downlink communication may be performed. In particular, the user equipment 10 is configured to receive (download) downlink data (also referred to as downlink information) from the base station 100 during the downlink slots. On the other hand, the uplink slots represent periods of time during which uplink communication may be performed. In particular, the user equipment 10 is configured to transmit (upload) uplink data (uplink information) to the base station during the uplink slots. The special/reserved slot S0 204 is used to provide some separation between downlink communication and uplink communication, and hence allow time for the wireless communication circuitry to reconfigure its operation between transmission and reception.

As shown in FIG. 3, each slot—including both downlink slots 202 and uplink slots 206—comprises seventeen resource block groups (RBGs) 208 in the frequency domain. Each RBG 208 represents a portion of the frequency range used by the base station to communicate with the plurality of terminals. In in the example of FIG. 3, the total frequency range is 48.6 MHz, and each RBG 208 covers a portion of that range—in this particular example, the first 16 RBGs (RBG0 to RBG15) each cover 2.88 MHz, while the $17^{th}$ RBG (RBG16) covers a range of 2.52 MHz (not shown in figure). However, it will be appreciated that this is just one example of the frequency ranges that could be covered by each of the RBGs, and in other examples all RBGs may cover an equal portion of the frequency range. Each RBG 208 is, in turn, divided into resource blocks (RBs) 210 in the frequency domain, each covering a portion of the frequency range covered by the RBG 208—in the example of FIG. 3, each RBG 208 other than the last one comprises sixteen RBs 210 (the last one, RBG16, comprises 14 RBs (not shown in figure)). Each RB 210 covers a frequency range of 180 kHz.

Finally, each RB 210 is further divided in both the time domain and the frequency domain. In particular, each RB 210 comprises fourteen orthogonal frequency domain multiplexing (OFDM) symbols 212 in the time domain and 12 subcarriers (SC) 214 in the frequency domain.

Different RBGs 208 within a single slot can be allocated for communication with different terminals if desired, and the wireless communication resources identified for each data allocation will indicate the RBGs allocated. It is also possible to allocate individual RBs 210 to different terminals—in which case the wireless communication resources identified for each data allocation will indicate the relevant RBs 210 allocated. Whilst each subcarrier/OFDM symbol unit (denoted by the individual squares in the right hand side of FIG. 3) may carry separate items of information, an individual RB is the smallest addressable unit in time and frequency, and hence the smallest individually allocatable unit of the frequency spectrum is the resource block.

By using different beams, it is possible to allocate the same RBs or RBGs to multiple terminals within the same slot, with each of the terminals using a different beam. Indeed, in one example implementation, when making data allocations, all of the useable RBGs for a downlink data allocation or an uplink data allocation are allocated to the identified terminal for that data allocation, and the use of different beams allows more than one terminal to be communicated with in a particular slot.

The uplink scheduling circuitry 108 and the downlink scheduling circuitry 106 each function to determine a transmission configuration (uplink transmission configuration and downlink transmission configuration) that will enable the apparatus to achieve a particular block error rate. In order to maximise throughput, the uplink transmission configuration and the downlink transmission configuration are each chosen such that the block error rate (BLER) achieved by the uplink transmission and the downlink transmission respectively are set equal to or less than a target block error rate.

Despite interleaving and Forward Error Correction (FEC), channel variability in the frequency domain may have a detrimental effect on the link quality of the uplink transmissions and the downlink transmissions. In general, each of the uplink scheduling circuitry 108 and the downlink scheduling circuitry 106 is configured to predict the BLER based on information indicative of a quality of the wireless communication. One way in which this can be achieved is illustrated in FIG. 4. The scheduling circuitry receives the information indicative of the quality of the wireless communication. In the illustrated configuration this information is provided as a plurality of measurements $s_j$ for j from 1 to N, where each measurement $s_j$ is indicative of a signal to interference and noise ratio (SINR) associated with one of the sub-carriers.

Typically, the average SINR is not a good metric in predicting the coded BLER. Because the SINR is a logarithmic quantity, the average SINR does not provide a good mechanism in predicting an appropriate Modulation and Coding Scheme (MCS) for the specified BLER target. In order to evaluate the system level performance of multi-user, multi-cell, multi-antenna OFDM systems without the need of conducting link-level simulations for every link, an Effective Signal to Interference Plus Noise Ratio (ESINR) mapping is used. The ESINR mapping uses a function that maps/compresses a vector of SINRs (one per each sub-carrier measured at the input of the FEC decoder) into an instantaneous scalar ESINR. The scheduling circuitry is therefore provided with ESINR mapping circuitry 402 to estimate an ESINR based on each of the measurements $s_j$. The ESINR is provided, in combination with information defining a modulation coding scheme and the block size, to the BLER predictor 400 that estimates a BLER. Using knowledge of the selected MCS and the block size, the BLER predictor takes the ESINR as an input and yields an estimate of the expected BLER.

The SINR for sub-carrier j is denoted by $s_j$. The ESINR block takes a vector of N SINRs and yields a scalar value $\bar{s}$. Based on the ESINR, the desired MCS and the block size, BLER prediction is achieved using a pre-computed family of BLER vs SINR curves. The aforementioned BLER curves are generated using link simulations assuming flat fading channels. For a large class of methods, the general ESINR method can be described as follows:

$$f\left(\frac{\bar{s}}{\alpha_1}\right) = \frac{1}{N}\sum_{n=1}^{N} f\left(\frac{s_n}{\alpha_2}\right)$$

where, $f(\cdot)$ is an invertible mapping function, $\bar{s}$ denotes the effective SINR, and N denotes the number of sub-carriers used to transmit the coded forward error correction block. Finally, the constants $\alpha_1$ and $\alpha_2$ depend on the current MCS.

In some configurations the exponential effective SINR method is used to derive the ESINR. $\bar{s}$ is derived from a vector of sub-band SINRs using the exponential effective SINR mapping function given by the following equation $$\bar{s} = -\beta \ln\left(\frac{1}{N}\sum_{n=0}^{N-1} e^{-\frac{s_n}{\beta}}\right)$$

where $s_n$ is the SINR on RBG index n, for n=0, 1, . . . , N−1 and N is the maximum number of RBGs, typically less than 20. Rearranging the terms we have the following function $$e^{-\frac{\bar{s}}{\beta}} = \frac{1}{N}\sum_{n=0}^{N-1} e^{-\frac{s_n}{\beta}}$$

which follows the general ESM formula by setting $\alpha_1=\alpha_2=\beta$. The parameter $\beta$ is chosen to provide an improved fit when mapping between the SINR values and the ESINR. In some configurations $\beta$ takes a value of less than 100. In some configurations a value of $\beta$=1.5 is used to obtain a mapping of SINR values to the ESINR values with improved accuracy.

To implement the exponential ESINR method the following rearrangement is applied to avoid numerical instability:

$$\begin{aligned}
\bar{s} &= -\beta \ln\left\{\frac{1}{N}\sum_{n=1}^{N}\exp(-s_n/\beta)\right\} \\
&= -\beta \ln\left\{\frac{1}{N}\sum_{n=1}^{N}\exp(-(\tilde{s}_n + s_{min})/\beta)\right\} \\
&= -\beta \ln\left\{\frac{1}{N}\sum_{n=1}^{N}\exp(-\tilde{s}_n/\beta)\exp(-s_{min}/\beta)\right\} \\
&= -\beta \ln\left\{\exp(-s_{min}/\beta)\frac{1}{N}\sum_{n=1}^{N}\exp(-\tilde{s}_n/\beta)\right\}
\end{aligned}$$

-continued $$= -\beta\ln\{\exp(-s_{min}/\beta)\} - \beta\ln\left\{\frac{1}{N}\sum_{n=1}^{N}\exp(-\tilde{s}_n/\beta)\right\}$$

$$= s_{min} - \beta\ln\left\{\frac{1}{N}\sum_{n=1}^{N}\exp(-\tilde{s}_n/\beta)\right\}, \text{ where}$$

$$s_n = s_{min} + \tilde{s}_n s_{min} = \min\{s_n\}$$

The calculation of the ESINR is then obtained by finding the minimum $s_{min}$ of the vector of SINRs. The minimum is then subtracted from each value and the ESINR of the modified values is calculated. Finally, the minimum value is added to obtain the ESINR. Once the ESINR is known it can be fed into the BLER predictor 400 to determine the BLER for a given MCS and block size.

The ESINR may be required for a number of different transmission configurations including different subsets of RBGs. In this scenario, the above method for calculation of the ESINR can be calculated repeatedly for each of the different transmission configurations. Alternatively, a recursive approach can be used which avoids repeated evaluations of ESINRs from previous subsets of RBGs, thus providing a reduction in the computational cost of computing the ESINR.

This is achieved by calculating an ESINR for a set of RBGs n=1, 2, . . . , k starting from a previously calculated ESINR, denoted $\bar{s}_{k-1}$, for RBGs n=1, 2, . . . , k−1. Denoting the ESINR for RBGs n=1, 2, . . . , k as $\bar{s}_k$, the recursive ESINR formula can obtained by modifying $\bar{s}_{k-1}$ by adding the fractional component of the SINR $s_k$. The ESINR for RBGs n=1, 2, . . . , k is given by:

$$\bar{s}_k = -\beta\ln\left(\frac{1}{k}e^{-\frac{s_k}{\beta}} + \frac{k-1}{k}e^{-\frac{\bar{s}_{k-1}}{\beta}}\right), \text{ for } k = 1, 2, \ldots$$

with the initial condition: $\bar{s}_0=0$. Hence, the ESINR at k is computed by the ESINR at k−1 and considering the current SINR at k.

The above recursive formula is obtained based on the assumption that the power budget is fixed and remains equal for all RBGs, irrespective of how many RBGs are allocated. Alternatively, assuming the total power is distributed equally only to the allocated RBGs 1 through to k, then the ESINR for RBGs n=1, 2, . . . , k can be obtained through the modified recursion formula $$\bar{s}_k = -\beta\ln\left(\frac{1}{k}e^{-\frac{K}{\beta k}s_k} + \frac{k-1}{k}e^{-\frac{k-1}{\beta k}\bar{s}_{k-1}}\right), \text{ for } k = 1, 2, \ldots, K$$

where K is the total number of RBGs available and with the initial condition: $\bar{s}_0=0$.

As a further alternative to performing the calculations set out above, a lookup table method can be used. Defining an information measure as $f(s/\beta)=1-\exp(-s/\beta)$, it can be shown that, starting from the general ESINR method formula $$f(\bar{s}/\alpha_1) = \frac{1}{N}\sum_{n=1}^{N} f(s_n/\alpha_2),$$

and letting $\alpha_1=\alpha_2=\beta$ that the exponential effective SNR can be derived as follows:

$$f\left(\frac{\bar{s}}{\beta}\right) = \frac{1}{N}\sum_{n=1}^{N} f\left(\frac{s_n}{\beta}\right) \Leftrightarrow$$

$$1 - \exp\left(-\frac{\bar{s}}{\beta}\right) = \frac{1}{N}\sum_{n=1}^{N}\left(1 - \exp\left(-\frac{s_n}{\beta}\right)\right) \Leftrightarrow$$

$$\exp\left(-\frac{\bar{s}}{\beta}\right) = \frac{1}{N}\sum_{n=1}^{N}\left(\exp\left(-\frac{s_n}{\beta}\right)\right) \Leftrightarrow$$

$$\bar{s} = -\beta\ln\left(\frac{1}{N}\sum_{n=1}^{N}\left(\exp\left(-\frac{s_n}{\beta}\right)\right)\right)$$

Hence, in the lookup table approach, a lookup table is used to convert between $s_n$ and a corresponding $f_n$. These values are then averaged to define an averaged $\bar{f}$ which is then mapped back to obtain $\bar{s}$. This method is illustrated in FIG. 5 in which two values $s_1$ 500 and $s_2$ 502 are mapped to a corresponding $f_1$ 510 and $f_2$ 512. The values of $f_1$ and $f_2$ are averaged to obtain an averaged information value $\bar{f}$ 514 which is mapped using the lookup table to obtain the ESINR s 504.

In the above methods, the BLER is predicted based on the ESINR and a particular MCS. Therefore, the above methods provide the means to select the MCS in order to achieve a particular BLER. The inventors have realised that an increased throughput can be achieved by carefully selecting a subset of RBGs, an MCS scheme and by using power boosting in which a total power budget is distributed across the selected RBGs. The approach is discussed for the cases of the downlink transmission scheduler and the uplink transmission scheduler below.

First, the downlink scheduling circuitry will be described with reference to accompanying FIGS. 6 to 13.

In the case of the downlink transmission scheduler, the user equipment is responsible for conducting channel quality measurements to determine channel quality information (CQI) based on downlink channel state information references signals (CSI-RS). These measurements are reported to the base station (apparatus) to assist the scheduler in determining resource allocation and MCS selection. The user equipment reports this information using feedback messages which are encoded and transmitted through the physical uplink control channel (PUCCH) or the physical uplink shared channel (PUSCH). The feedback messages include channel quality information which is provided as wideband channel quality information and indicative of an average channel quality information, for example related to an ESINR, and differential channel quality information indicative of a difference between the wideband channel quality information and the sub-band channel quality information. Typically, this information is compressed in order to reduce the transmission overhead associated with this signal.

As an example, 5G using Numerology 0 with maximum bandwidth set to 50 MHz is considered. In this case, a total of 17 sub-bands (or Resource Block Groups RBGs) each comprising of 16 RBs can be used. In addition, up to 8 CSI-RS resources ($=2^3$) can be configured. A CSI-RS resource may be associated with a specific beam. This association assists the UE to differentiate the various downlink beams and report the preferred beam to the base station. The CRI denotes the CSI Resource Indicator, i.e., the preferred beam index. For non beam-formed systems the CRI field is missing, i.e., not reported.

The CQI is built up by a wideband and a plurality of sub-band reports. The CSI report employing the "cri-RI-CQI" feedback is shown, for example, in Table 1.

TABLE 1

| CSI Report cri-RI-CQI | |
|---|---|
| Field | Bitwidth |
| CRI | $\lceil \log_2 (K_s^{CSI-RS}) \rceil = 3$ |
| Wideband CQI | 4 |
| Sub-band differential CQI | 2 × sub-band = 2 × (270/16) = 2 × 17 = 34 |
| Total | 41 |

The differential sub-band CQI values are defined relative to the wideband CQI value using the following expression.

Differential sub-band CQI=Sub-band offset=Sub-band CQI−Wideband CQI

Each sub-band therefore is allocated only 2 bits of information to define the differential sub-band CQI. The mapping between CQI offset and the differential value is defined, for example, in Table 2.

TABLE 2

| Mapping for Differential CQI values | |
|---|---|
| Sub-band differential CQI value | Offset level |
| 0 | 0 |
| 1 | 1 |
| 2 | >=2 |
| 3 | <= −1 |

As discussed, the base station receives the CSI report which is passed to the downlink scheduling circuitry to determine a downlink transmission configuration. As discussed, the downlink scheduling circuitry could consider the wideband channel quality information (which, for example, is related to an ESINR calculated by the user equipment) to determine a modulation coding scheme. This can be achieved using a lookup table, for example, Table 3, to estimate an appropriate MCS scheme associated with a particular CQI index for the wideband CQI.

TABLE 3

| MCS/CQI mapping | |
|---|---|
| CQI Index | MCS Index |
| 0 | Out of Range |
| 1 | 0 |
| 2 | 0 |
| 3 | 2 |
| 4 | 4 |
| 5 | 6 |
| 6 | 8 |
| 7 | 11 |
| 8 | 13 |
| 9 | 15 |
| 10 | 18 |
| 11 | 20 |
| 12 | 22 |
| 13 | 24 |
| 14 | 26 |
| 15 | 28 |

Once the MCS has been estimated, a wideband SINR can, for a given target BLER, be calculated based on the estimated MCS using a second lookup table, for example, as illustrated in Table 4.

TABLE 4

| MCS vs SINR | | | |
|---|---|---|---|
| MCS Index $I_{MCS}$ | Target SINR at 10% BLER | Target SINR at 5% BLER | Target SINR at 1% BLER |
| 0 | −5.27 | −5.22 | −5.11 |
| 1 | −4.11 | −4.04 | −3.89 |
| 2 | −3.10 | −3.02 | −2.91 |
| 3 | −1.94 | −1.89 | −1.77 |
| 4 | −1.02 | −1.00 | −0.91 |
| 5 | 0.05 | 0.10 | 0.21 |
| 6 | 0.98 | 1.02 | 1.09 |
| 7 | 1.96 | 2.00 | 2.10 |
| 8 | 2.78 | 2.82 | 2.89 |
| 9 | 3.69 | 3.74 | 3.80 |
| 10 | 4.68 | 4.73 | 4.84 |
| 11 | 5.34 | 5.39 | 5.53 |
| 12 | 6.26 | 6.30 | 6.40 |
| 13 | 6.92 | 6.98 | 7.09 |
| 14 | 7.93 | 7.99 | 8.14 |
| 15 | 8.70 | 8.77 | 8.89 |
| 16 | 9.37 | 9.41 | 9.54 |
| 17 | 10.09 | 10.15 | 10.26 |
| 18 | 10.68 | 10.76 | 10.93 |
| 19 | 11.61 | 11.67 | 11.78 |
| 20 | 12.51 | 12.58 | 12.70 |
| 21 | 13.27 | 13.34 | 13.49 |
| 22 | 14.09 | 14.15 | 14.25 |
| 23 | 14.99 | 15.07 | 15.22 |
| 24 | 16.14 | 16.19 | 16.31 |
| 25 | 17.04 | 17.09 | 17.27 |
| 26 | 17.84 | 17.89 | 18.00 |
| 27 | 18.44 | 18.48 | 18.59 |
| 28 | 19.08 | 19.13 | 19.20 |

The values set out in the tables throughout the description are provided as examples only. It would be readily apparent to the skilled person that alternative values could be used based on the particular communication system and/or standard that is being implemented. Furthermore, the MCS vs SINR values set out in table 4 may be the same or may vary for uplink and downlink transmissions within the same implementation.

Hence, the base station can infer a relationship between the SINR and the CQI. In order to further improve the throughput of the communication system, the differential CQI is used to select a subset of downlink resource blocks that will provide an improved throughput for a wireless downlink connection. In particular, it is desirable that, when only a subset of downlink resource blocks are used, the choice of subset is based on the downlink resource blocks that have a highest SINR.

However, the differential CQI provides only a coarse discretisation of the sub-band quality. Because only two bits per sub-band are provided, only 4 states can be reported. The last state indicates an undermined offset below the average CQI. This provides a limited feedback for the base station to approximate the absolute value of the sub-band CQIs. In order to obtain an approximation of the sub-band CQI values, the following differential CQI levels are assumed:

TABLE 5

Reported differential sub-band and assumed CQI offset levels

| Differential Sub-band CQI value | Offset level | Assumed Level $\Delta q_n$ |
|---|---|---|
| 0 | 0 | 0 |
| 1 | 1 | 1 |
| 2 | ≥2 | 2 |
| 3 | ≤ −1 | x |

In other words, it is assumed that the differential CQI for all sub-bands that have a differential sub-band CQI value of 0 is given by the wideband CQI value; the differential CQI for all sub-bands that have a differential sub-band CQI value of 1 is given by the wideband CQI value plus one; the differential CQI for all sub-bands that have a differential sub-band CQI value of 2 is given by the wideband CQI value plus two; and the differential CQI for all sub-bands that have a differential sub-band CQI value of 3 is given by the wideband CQI value plus a same (to be determined) unknown value denoted as x. By assigning a value of 2 for all cases in which the differential sub-band-CQI value indicates an offset of greater than or equal to 2, a worst case scenario is assumed. Using the knowledge that the wideband CQI value is obtained as a function of all the sub-band CQI values an equation can be written to define x as a single unknown and, hence, an estimate of the CQI for each of the sub-bands can be obtained.

FIG. 6 schematically illustrates a method by which the SINR level of the sub-bands is estimated. Flow begins at step S600 where the downlink scheduling circuitry determines the wideband modulation coding scheme based on wideband channel quality information (wideband CQI) that is provided as part of the CSI report. This can be achieved, for example, using lookup tables storing information as set out in Table 3. Flow then proceeds to step S602 where the wideband SINR is estimated from the wideband MCS. This is achieved for a given target block error rate (BLER) and can be implemented, for example using a lookup table storing information as set out in Table 4. The target block error rate is a known quantity that is provided in advance. Flow then proceeds to step S604 where it is determined whether any of the differential sub-band CQI values is equal to 0. If so, then the sub-band CQI values for those sub-bands are set equal to the wideband CQI level. Flow then proceeds to step S606 where it is determined whether any of the differential sub-band CQI values is equal to 1. If so, then the sub-band CQI values for those sub-bands are set equal to the wideband CQI level plus one. Flow then proceeds to step S608 where it is determined whether any of the differential sub-band CQI values is equal to 2. If so, then the sub-band CQI values for those sub-bands are set equal to the wideband CQI level plus two. Flow then proceeds to step S610 where it is determined whether any of the differential sub-band CQI values is equal to 3. If so, then the sub-band CQI values for those sub-bands are set equal to nill or otherwise marked as being as yet undetermined. Flow then proceeds to step S612 where the SINR level of the sub-bands is estimated such that the sub-bands that are marked as being nill are selected to ensure that the effective SINR of the entire band matches the estimated wideband SINR.

Using the exponential effective signal to interference and noise method (as discussed above), the wideband effective SINR, g, is derived from a vector of sub-band SINRs using the exponential effective SINR mapping function given by the following equation $$\hat{s} = -\beta \ln\left(\frac{1}{N}\Sigma_{n=0}^{N-1} e^{-\frac{s_n}{\beta}}\right)$$

where $s_n$ is the SINR on RBG index n, for n=0, 1, . . . , N−1. N is the maximum number of RBGs, typically less than 20.

Rearranging the terms the following function is obtained $$e^{-\frac{s}{\beta}} = \frac{1}{N}\Sigma_{n=0}^{N-1} e^{-\frac{s_n}{\beta}}$$

Defining $\bar{\mathcal{N}}$ and $\mathcal{N}$ as the set of RBG indices where the sub-band differential CQI offset levels are negative (those sub-bands for which the CQI values have been set to nill) and non-negative (those sub-bands for which the CQI values have been set to a non-nill value, respectively. $\bar{\mathcal{N}}$ and $\mathcal{N}$ are mutually exclusive and collectively exhaustive subsets of the RBGs such that their union is another set containing all the RBG indices, i.e.

$$\bar{\mathcal{N}} \cup \mathcal{N} = \{0,1,2, \ldots, N-1\}$$

The average SINR belonging to the set $\mathcal{N}$ is given by $$\bar{s} = \frac{1}{|\mathcal{N}|}\Sigma_{n\in\mathcal{N}} s_n,$$

where $|\mathcal{N}|$ denotes the size of $\mathcal{N}$. Rewriting s n as comprising wo components; the average SINR $\bar{s}$ and the differential SINR $\Delta s_n$, i.e. $s_n = \bar{s} + \Delta s_n$, for $n \in \mathcal{N}$ an expression is obtained to estimate the SINRs in the set $\bar{\mathcal{N}}$.

As discussed, all RBGs for which the differential sub-band CQI value is equal to 3 are treated as having the same offset level and the same unknown SINR x. Thus, the effective SINR formula above can be rewritten as follows:

$$e^{-\frac{s}{\beta}} = \frac{1}{N}\Sigma_{n=0}^{N-1} e^{-\frac{s_n}{\beta}} = \frac{1}{N}\Sigma_{n\in\mathcal{N}} e^{-\frac{s_n}{\beta}} + \frac{1}{N}\Sigma_{n\in\bar{\mathcal{N}}} e^{-\frac{s_n}{\beta}} = \frac{1}{N}\Sigma_{n\in\mathcal{N}} e^{-\frac{s_n}{\beta}} + \frac{|\bar{\mathcal{N}}|}{N} e^{-\frac{x}{\beta}},$$

Solving for x, yields $$x = \beta \ln(|\bar{\mathcal{N}}|) - \beta \ln\left(N e^{-\frac{s}{\beta}} - e^{-\frac{s}{\beta}} \Sigma_{n\in\mathcal{N}} e^{-\frac{\Delta s_n}{\beta}}\right)$$

In some rare instances, i.e. when a solution does not exist, x may yield a negative number. In that case, x is set to a small value, i.e., x=0.05, which translates to −13 dB, a small value to indicate a low SINR level.

Alternatively, and as illustrated in FIG. 7 a lookup table method can be used to determine the unknown SINR x 710. In FIG. 7 four SINRs are known: $s_0$ 702, $s_1$ 704, $s_2$ 706, and $\hat{s}$ 708. $s_0$ denotes the estimated SINR for the RBGs that have signalled a differential CQI of 0. $s_1$ denotes the estimated SINR for the RBGs that have signalled a differential CQI of 1. $s_2$ denotes the estimated SINR for the RBGs that have signalled a differential CQI of 2. Finally, $\hat{s}$ denotes the estimated wideband SINR. These values are mapped using a lookup table that stores the SINR mapping function 700 to information values $f_0$ 712, $f_1$ 714, and $f_2$ 716. In addition, the wideband SINR $\hat{s}$ 708 is mapped to an information value 718. The unknown information value corresponding to the unknown SINR x 710 can then be calculated using the knowledge that the information value $\hat{f}$ 718 is equal to the weighted average of the information values $f_0$ 712, $f_1$ 714, $f_2$ 716, and the unknown information value $f_x$ 720. The unknown function can then be mapped to the unknown SINR value, x, using the lookup table. The weighting mentioned above takes into account the number of instances of x, $s_0$, $s_1$ and $s_2$ that are present in the feedback channel. The sum of the instances is equal to the number of RBGs.

The preceding steps therefore indicate how an estimate of the channel quality (the SINR) can be determined without actually transmitting the SINR and by instead providing channel quality information (CQI) that is indicative of the SINR and that is used by the base station to estimate the SINR for each sub-band. Once the SINRs have been estimated for each of the sub-bands, it is possible to obtain an estimate of the subset of downlink resource blocks that maximise throughput. In particular, the estimated SINR can be converted, for the given target BLER, to a corresponding MCS using, for example, Table 4. FIG. 8 schematically illustrates a worked example for estimating the unknown SINR using the method described in relation to FIGS. 6 and 7. In the illustrated example, information indicative of the wideband CQI and the differential sub-band CQI is received for 17 resource blocks (RBGs 0 through to 16).

In the illustrated example, the wideband CQI is 3 and a range of differential CQI values are received. In particular RBGs 3, 6, 9, 11, 13, and 16 each have a differential CQI of indicating that the CQI for that sub-band is equal to the wideband CQI. Hence, the assumed sub-band CQI level of RBGs 3, 6, 9, 11, 13, and 16 is 3. RGBs 5 and 14 have a differential sub-band CQI of 1 indicating that the CQI for those sub-bands is equal to the wideband CQI plus one. Hence, RGBs 5 and 14 have a assumed sub-band CQI level of 4. RGBs 1, 8, and 15 have a differential sub-band CQI of 2 indicating that the CQI for those sub-bands is equal to the wideband CQI plus 2. Hence, RGBs 1, 8, and have an assumed sub-band CQI level of 5. Finally, RBGs 0, 2, 4, 7, 10, and 12 have a differential sub-band CQI equal to 3 indicating that the wideband CQI for that sub-band is less than the wideband CQI that has been reported. Hence, the assumed sub-band CQI level for RBGs 0, 2, 4, 7, 10, and 12 is set to nill. The downlink scheduling circuitry is arranged to calculate the wideband MCS and a wideband SINR using, for example, lookup tables (e.g., Tables 3 and 4). Based on the wide band CQI value of 3, the wideband MCS of 2 is determined from Table 3, and a wideband SINR of −3.10 dB is determined from Table 4 at a BLER of 10%. In the illustrated example, the number of negative offsets is equal to 6. The downlink scheduling circuitry is arranged to calculate, using the method described in relation to FIGS. 6 and 7, the estimated SINR for each of RBGs 1, 3, 5-6, 8-9, 11 and 13-16, by first calculating the assumed MCS value for each of the assumed sub-band CQI levels (using, for example, Table 3) and then, for a given target BLER, calculating the estimated SINR for the assumed MCS (using, for example, Table 4). In the illustrated example, the assumed MCS of RBGs 3, 6, 9, 11, 13, and 16 is 2 corresponding to an estimated SINR of −3.10 dB at a BLER of 10%. The assumed MCS of RBGs 5 and 14 is 4 corresponding to an estimated SINR of −1.02 dB at a BLER of 10%. The assumed MCS of RBGs 1, 8, and 15 is 6 corresponding to an estimated SINR of 0.98 dB at a BLER of 10%. The estimated SINR is then calculated for RBG 0, 2, 4, 7, 10, and 12 using either the analytic method described above or the lookup table method described in relation to FIG. 7. As a result, the SINR of RBG 0, 2, 4, 7, 10, and 12 is estimated to be −8.44. As a result the SINR of each RBG can be estimated and the RBGs that have higher SINR and lower SINR can be determined.

As described, it may be beneficial to, instead of using all RBGs for a scheduled downlink transmission, to use only the subset of RBGs that have the higher SINR and to distribute the power budget between the subset of RBGs that have the higher SINR to further boost the SINR and improve the throughput of those RBGs. A method by which this is achieved is described in FIG. 9. Flow begins at step S900 where the RBGs are ordered in decreasing estimated SINR levels such that the RBG with the highest SINR is first and the RBG with the lowest SINR level is last. Flow then proceeds to step S902 where a variable N is set to 0. The variable N is used as an index to step through configurations that include different numbers of RBGs. Flow then proceeds to step S904, where the variable N is incremented by 1. Flow then proceeds to step S906 where the first N RBGs are selected, i.e. the N RBGs with the highest SINRs are selected. Flow then proceeds to step S908 where a power budget is distributed equally between the N selected RBGs. It will be appreciated that when a smaller number of RBGs is selected, the portion of the total power budget that is received by each RBG is larger than a case in which a larger number of RBGs is selected. Flow then proceeds to step S910 where the ESINR is calculated. The ESINR can be calculated using any of the methods described hereinabove based on the estimated SINR ratios that have been calculated for the RBGs and that have been subjected to power boosting. In other words, the SINRs that are used to calculate the ESINR are those that were estimated using the method as set out in reference to FIGS. 6 to 7 that have been further increased due to the power boosting. For example, where N is equal to 1, the ESINR is equal to the estimated SINR for the RBG with the highest SINR modified to reflect that the entire power budget is allocated to that RBG. Flow then proceeds to step S912 where the associated MCS is derived (using, for example, Table 4 for a given target BLER). Flow then proceeds to S914 where the throughput for the current MCS is estimated. This can be achieved using a lookup table that is stored by the downlink scheduling circuitry. For example, the lookup table could comprise Tables 6-8 set out below.

TABLE 4

DL throughput for various RBG sizes and MCS index 0 to 9

| RBG | 0 | 1 | 2 | 3 | 4 | 5 | 6 | 7 | 8 | 9 |
|---|---|---|---|---|---|---|---|---|---|---|
| 1 | 0.36 | 0.46 | 0.59 | 0.73 | 0.93 | 1.12 | 1.33 | 1.56 | 1.79 | 2.02 |
| 2 | 0.72 | 0.93 | 1.16 | 1.48 | 1.86 | 2.25 | 2.61 | 3.07 | 3.53 | 3.99 |
| 3 | 1.08 | 1.37 | 1.71 | 2.25 | 2.69 | 3.30 | 3.92 | 4.61 | 5.23 | 6.00 |
| 4 | 1.44 | 1.86 | 2.25 | 2.92 | 3.61 | 4.45 | 5.23 | 6.15 | 7.07 | 7.99 |

TABLE 4-continued

| DL throughput for various RBG sizes and MCS index 0 to 9 | | | | | | | | | | |
|---|---|---|---|---|---|---|---|---|---|---|
| RBG | 0 | 1 | 2 | 3 | 4 | 5 | 6 | 7 | 8 | 9 |
| 5 | 1.79 | 2.27 | 2.85 | 3.69 | 4.45 | 5.53 | 6.61 | 7.68 | 8.76 | 9.84 |
| 6 | 2.10 | 2.77 | 3.38 | 4.38 | 5.38 | 6.61 | 7.84 | 9.22 | 10.45 | 11.98 |
| 7 | 2.46 | 3.23 | 3.92 | 5.07 | 6.30 | 7.68 | 9.22 | 10.76 | 12.30 | 13.82 |
| 8 | 2.77 | 3.69 | 4.54 | 5.85 | 7.22 | 8.91 | 10.45 | 12.30 | 14.14 | 15.98 |
| 9 | 3.15 | 4.15 | 5.07 | 6.61 | 8.15 | 9.84 | 11.68 | 13.82 | 15.98 | 17.82 |
| 10 | 3.54 | 4.61 | 5.69 | 7.38 | 9.07 | 11.06 | 13.22 | 15.36 | 17.52 | 19.67 |
| 11 | 3.84 | 5.07 | 6.15 | 7.99 | 9.84 | 12.30 | 14.44 | 16.90 | 19.36 | 22.14 |
| 12 | 4.23 | 5.53 | 6.77 | 8.76 | 10.76 | 13.22 | 15.67 | 18.44 | 20.89 | 23.96 |
| 13 | 4.54 | 5.99 | 7.38 | 9.54 | 11.68 | 14.44 | 17.21 | 20.29 | 22.74 | 25.82 |
| 14 | 4.92 | 6.45 | 7.84 | 10.14 | 12.60 | 15.36 | 18.44 | 21.51 | 24.59 | 27.66 |
| 15 | 5.23 | 6.92 | 8.45 | 11.07 | 13.52 | 16.59 | 19.67 | 23.36 | 26.42 | 29.51 |
| 16 | 5.53 | 7.38 | 9.07 | 11.68 | 14.44 | 17.82 | 20.89 | 24.59 | 28.27 | 31.97 |
| 17 | 5.85 | 7.68 | 9.54 | 12.31 | 15.06 | 18.74 | 22.14 | 25.82 | 29.51 | 33.82 |

TABLE 7

| DL throughput for various RBG sizes and MCS index 10 to 19 | | | | | | | | | | |
|---|---|---|---|---|---|---|---|---|---|---|
| RBG | 10 | 11 | 12 | 13 | 14 | 15 | 16 | 17 | 18 | 19 |
| 1 | 2.02 | 2.25 | 2.53 | 2.84 | 3.23 | 3.61 | 3.84 | 3.84 | 4.07 | 4.53 |
| 2 | 3.99 | 4.38 | 5.07 | 5.69 | 6.46 | 7.22 | 7.68 | 7.68 | 8.15 | 9.07 |
| 3 | 6.00 | 6.61 | 7.53 | 8.61 | 9.68 | 10.76 | 11.68 | 11.38 | 12.30 | 13.52 |
| 4 | 7.99 | 8.76 | 10.14 | 11.38 | 12.90 | 14.44 | 15.36 | 15.36 | 16.29 | 18.13 |
| 5 | 9.84 | 11.06 | 12.60 | 14.44 | 16.29 | 18.13 | 19.36 | 19.36 | 20.29 | 22.74 |
| 6 | 11.98 | 13.22 | 15.36 | 17.21 | 19.36 | 21.51 | 23.36 | 23.36 | 24.59 | 27.06 |
| 7 | 13.82 | 15.36 | 17.82 | 20.29 | 22.74 | 25.21 | 27.06 | 27.06 | 28.90 | 31.97 |
| 8 | 15.98 | 17.82 | 20.29 | 22.74 | 25.82 | 28.90 | 30.73 | 30.73 | 32.58 | 36.27 |
| 9 | 17.82 | 19.67 | 22.74 | 25.82 | 28.90 | 32.58 | 34.43 | 34.43 | 36.89 | 40.55 |
| 10 | 19.67 | 22.14 | 25.21 | 28.90 | 32.58 | 36.27 | 38.73 | 38.73 | 40.55 | 45.48 |
| 11 | 22.14 | 24.59 | 27.66 | 31.33 | 35.66 | 39.35 | 41.80 | 41.80 | 45.48 | 50.39 |
| 12 | 23.96 | 26.42 | 30.73 | 34.43 | 38.73 | 43.01 | 46.74 | 46.74 | 49.19 | 54.11 |
| 13 | 25.82 | 28.90 | 33.18 | 37.50 | 41.80 | 46.74 | 50.39 | 50.39 | 52.84 | 59.03 |
| 14 | 27.66 | 30.73 | 35.66 | 40.55 | 45.48 | 50.39 | 54.11 | 54.11 | 57.76 | 63.95 |
| 15 | 30.11 | 33.18 | 38.12 | 43.01 | 47.94 | 54.11 | 57.76 | 57.76 | 61.45 | 67.59 |
| 16 | 31.97 | 35.66 | 40.55 | 45.48 | 51.62 | 57.76 | 61.45 | 61.45 | 65.13 | 72.56 |
| 17 | 33.82 | 37.50 | 43.01 | 47.94 | 54.11 | 60.24 | 65.13 | 65.13 | 68.87 | 76.25 |

TABLE 8

| DL throughput for various RBG sizes and MCS index 20 to 28 | | | | | | | | | |
|---|---|---|---|---|---|---|---|---|---|
| RBG | 20 | 21 | 22 | 23 | 24 | 25 | 26 | 27 | 28 |
| 1 | 4.92 | 5.38 | 5.84 | 6.30 | 6.76 | 7.22 | 7.68 | 7.99 | 8.30 |
| 2 | 9.84 | 10.76 | 11.68 | 12.60 | 13.52 | 14.44 | 15.36 | 15.98 | 16.59 |
| 3 | 15.06 | 16.29 | 17.52 | 19.05 | 20.29 | 21.51 | 22.74 | 23.96 | 25.21 |
| 4 | 19.67 | 21.51 | 23.36 | 25.21 | 27.06 | 28.90 | 30.73 | 31.97 | 33.18 |
| 5 | 24.59 | 27.06 | 29.51 | 31.33 | 33.82 | 36.27 | 38.12 | 39.35 | 41.80 |
| 6 | 30.11 | 32.58 | 35.03 | 38.12 | 40.55 | 43.01 | 45.48 | 47.94 | 50.39 |
| 7 | 35.03 | 38.12 | 40.55 | 44.27 | 47.94 | 50.39 | 54.11 | 55.32 | 57.76 |
| 8 | 39.35 | 43.01 | 46.74 | 50.39 | 54.11 | 57.76 | 61.45 | 63.95 | 66.38 |
| 9 | 44.27 | 49.19 | 52.84 | 56.55 | 61.45 | 65.13 | 68.87 | 71.34 | 75.01 |
| 10 | 49.19 | 54.11 | 59.03 | 62.70 | 67.59 | 72.56 | 76.25 | 78.71 | 83.63 |
| 11 | 55.32 | 59.03 | 63.95 | 68.87 | 75.01 | 78.71 | 83.63 | 88.55 | 90.96 |
| 12 | 60.24 | 65.13 | 70.08 | 76.25 | 81.18 | 86.04 | 90.96 | 95.93 | 100.79 |
| 13 | 65.13 | 70.08 | 76.25 | 81.18 | 88.55 | 93.47 | 100.79 | 103.31 | 108.23 |
| 14 | 70.08 | 76.25 | 81.18 | 88.55 | 95.93 | 100.79 | 108.23 | 110.65 | 115.57 |
| 15 | 75.01 | 81.18 | 88.55 | 95.93 | 100.79 | 108.23 | 115.57 | 120.48 | 125.39 |
| 16 | 78.71 | 86.04 | 93.47 | 100.79 | 108.23 | 115.57 | 122.99 | 127.91 | 132.83 |
| 17 | 83.63 | 90.96 | 98.39 | 105.72 | 115.57 | 122.99 | 130.28 | 135.29 | 140.16 |

Flow then proceeds to step S916 where it is determined if all the RBGs have been considered. In other words it is determined if N is equal to the total number of RBGs. If all the RBGs have not been considered then flow returns to step S904. If, on the other hand, all the RBGs have been considered then flow proceeds to step S918 where the MCS and number of RBGs that have the highest throughput are determined. It would be appreciated by the skilled person that, whilst steps S902 to S916 have been illustrated as occurring sequentially for each N, in alternative configurations these steps could be carried out for all N, or a subset of N in parallel.

FIGS. 10*a* and 10*b* schematically illustrate the application of the method set out in FIG. 9 to the example described in relation to FIG. 8. In particular, FIGS. 10*a* and 10*b* show the RBGs listed in order of decreasing SINR. In particular, resource blocks 1, 8 and 15, which each had a differential CQI value of 2 (see FIG. 8), are listed first. Blocks 5 and 14, which each had a differential CQI value of 1 (see FIG. 8), are listed next. Blocks 3, 6, 9, 11, 13, and 16, which each had a differential CQI value of 0 (see FIG. 8) are listed next. Finally, blocks 0, 2, 4, 7, 10, and 12, which each had a differential CQI value of 3 (see FIG. 8) are listed last. The relative ordering of the RBGs having the same CQI value is not relevant in this example. FIGS. 10*a* and 10*b* schematically illustrate the result of considering N RBGs for N=1 through to 17. In particular, FIG. 10*a* illustrates the result of considering N from 1 to 10 and FIG. 10*b* illustrates the result of considering N from 11 to 17. For each N the power boost in dB is provided. The power boost is equal to 10 $\log_{10}(17/N)$ and is equal to the power boost in dB that is provided for distributing the total power budget between N RBGs.

Taking N=1 as a first example, the power boost is equal to 12.30 dB. The SINR with power boosting for the first RBG is therefore equal to 13.28 dB which is given by taking the estimated SNR in dB and adding the power boost in dB. In this case, because there is only 1 RBG considered, the ESINR is equal to the SINR with power boosting. The corresponding MCS is determined from Table 4 for a target BLER of 10% and is equal to 21. Finally, using Tables 6 to 8 the corresponding throughput in Mbps can be estimated as 5.38.

Taking N=2 as a second example, the power boost is equal to 9.29 dB. The SINR with power boosting for the first RBGs is therefore equal to 10.27 for each of the N=2 RBGs which is given by taking the estimated SINR in dB for each of the RBGs that are considered and adding the power boost in dB. In this case, because both of the selected RBGs have a same SINR, the ESINR is equal to the SINR with power boosting of each of the RBGs. The corresponding MCS is determined from Table 4 for a target BLER of 10% and is equal to 17. Finally, using Tables 6 to 8 the corresponding throughput in Mbps can be estimated as 7.68.

Taking N=6 as a third example, the power boost is equal to 4.52 dB. The SINR with power boosting for the first RBGs is therefore equal to 5.50 for each of RBGs 1, 8, and 15; the SINR with power boosting for RBGs 5 and 14 is 3.50 dB because the estimated SINR for RBGs 5 and 14 is lower than the estimated SINR for RBGs 1, 8, and 15; and the SINR with power boosting for RBG 3 is 1.42 dB because the estimated SINR for RBGs 1, 8, 15, 5, and 14 is lower than the estimated SINR for RBG 3. In this case, because not all of the selected RBGs have a same SINR, the ESINR (calculated using the method set out in relation to FIGS. 4 and 5) is different to each of the SINRs with power boosting and is equal to 3.99. The corresponding MCS is determined from Table 4 for a target BLER of 10% and is equal to 9. Finally, using Tables 6 to 8 the corresponding throughput in Mbps can be estimated as 11.98.

Taking N=17, illustrated in FIG. 10*b*, as a fourth example, the power boost is equal to 0 dB because the total power budget is split between all the RBGs, i.e., there are no RBGs to which none of the total power budget is allocated. The SINR with power boosting is equal to the estimated SINR. Specifically RBGs 1, 8, and 15 have an SINR with power boosting of 0.98 dB; RBGs 5 and 14 have a SINR with power boosting of −1.02 dB; RBGs 3, 6, 9, 11, 13 and 16 have a SINR with power boosting of −3.10 dB and RBGs 0, 2, 4, 7, 10, and 12 have a SINR with power boosting of −8.44 dB. In this case, because not all of the selected RBGs have a same SINR, the ESINR (calculated using the method set out in relation to FIGS. 4 and 5) is different to each of the SINRs with power boosting and is equal to −3.10. The corresponding MCS is determined from Table 4 for a target BLER of 10% and is equal to 2. Finally, using Tables 6 to 8 the corresponding throughput in Mbps can be estimated as 9.54.

The throughput is calculated for each possible value of N. FIG. 11 schematically illustrates the MCS index and the throughput 1100 for each of the different values of N (the number of active RBGs). As the number of RBGs that are active is increased, the power boosting decreases because the total power budget has to be split between a greater number of active RBGs. As a result, the MCS index is decreased in order to achieve the required target BLER. Hence, as the number of RBGs is increased each RBG is able to carry less useful information. The total throughput is therefore non-monotonic as the number of active RBGs is increased and optimum peak throughput 1102 is obtained. In the illustrated example, the number of active RBGs that achieves the maximum throughput is 7. Hence, the downlink scheduling circuitry schedules 7 RBGs as the number of RBGs with a corresponding MCS of 8.

In the example set out in FIG. 11 there are three combinations of MCS values with a corresponding set of RBGs that yield the peak throughput of 12.3 Mbps. Namely, MCS=8 using 7 RBGs, MCS=7 using 8 RBGs, and MCS=5 using 11 RBGs. Whilst each of these solutions provide the same throughput, it is generally more desirable to select the combination that utilises the smallest number of RBGs. This is advantageous because it reduces interference to other users in the network who are not connected to the current base station, especially when power boosting is not enabled, and it leaves a greater number of unused RBGs which increases the overall capacity and throughput since more users within the same sector may be scheduled by the base station.

FIG. 12 illustrates a method for selecting the particular RBGs that are used for the downlink transmission, given a number of RBGs to select. Flow begins at step S1200 where a number of variables are defined. C0 is the number of RBGs for which the differential sub-band CQI is equal to 0. C1 is the number of RBGs for which the differential sub-band CQI is equal to 1. C2 is the number of RBGs for which the differential sub-band CQI is equal to 2. C3 is the number of RBGs for which the differential sub-band CQI is equal to 3. R is the number of active RBGs that have been determined to achieve the peak throughput. Flow then proceeds to step S1202 where it is determined if R is less than or equal to C2. If yes then flow proceeds to step S1222 where R RBGs are randomly selected from the group of RBGs for which the differential sub-band CQI is equal to 2. If, at step S1202, it was determined that R is greater than C2 then flow proceeds to step S1204 where all the RBGs for which the differential sub-band CQI is equal to 2 are selected. Flow then proceeds to step S1206 where R is reduced by C2. Flow then proceeds to step S1208 where it is determined if R is less than or equal to C1. If yes then flow proceeds to step S1224 where R RBGs are randomly selected from the group of RBGs for which the differential sub-band CQI is equal to 1. If, at step S1208, it was determined that R is greater than C1 then flow proceeds to step S1210 where all the RBGs for which the differential sub-band CQI is equal to 1 are selected. Flow then proceeds to step S1212 where R is reduced by C1. Flow then proceeds to step S1214 where it is determined if R is less than or equal to C0. If yes then flow proceeds to step S1226 where R RBGs are randomly selected from the group of RBGs for which the differential sub-band CQI is equal to 0. If, at step S1214, it was determined that R is greater than C0 then flow proceeds to step S1216 where all the RBGs for which the differential sub-band CQI is equal to 0 are selected. Flow then proceeds to step S1218 where R is reduced by C0. Flow then proceeds to step S1220 where the remaining R RBGs are randomly selected from the group of RBGs for which the differential sub-band CQI is equal to 3. In this way the peak throughput is obtained but without favouring the RBGs that appear sequentially first in order of frequency. As will be described in detail below, the process illustrated in FIG. 12 is not applicable to the uplink case in which the RBGs are fully defined in the process of determining a peak throughput and there is no additional freedom to choose a particular set of RBGs to provide the determined optimum is available.

In some configurations, the random selection in steps S1222, S1224, S1226 and S1220 are uniform with there being an equal probability that any of the RBGs are selected from the group of RBGs from which the selection is being made. In some alternative configurations, the selection of downlink RBGs is based on a-priori knowledge that some RBGs have a higher likelihood of reduced interference. In such configurations the random selection is biased in favour of the RBGs for which it is known that there is a higher likelihood of reduced interference. In other words, historical data can be used to establish that less interference is present in one RBG (e.g., RBG-X) than another RBG (e.g., RBG-Y). Hence, when the estimated ESINR for both RBG-X and RBG-Y is the same, then the random selection is biased so that RBG-X is selected more often than RBG-Y to improve the chances of an overall reduction of the BLER.

In some configurations, the estimate for the SINR for RBGs with a differential sub-band CQI of 3 (see, for example, table 2) is achieved by pre-computing the SINR to be associated with RBGs with the differential sub-band of 3 and storing this information in a table. For the case of 17 RBGs, there are 1140 possible combinations of different sub-band values corresponding to all valid combinations of four digit numbers in base 17 whose sum of digits is equal to 17. The first digit is the number of RBGs that reported a differential sub-band CQI of 0. The second digit is the number of RBGs that reported a differential sub-band CQI of 1. The third digit is the number of RBGs that reported a differential sub-band CQI of 2. Finally, the forth digit is the number of RBGs that reported a differential sub-band CQI of 3. The fourth digit can be derived by subtracting the sum of the previous digits from 17. It would be readily apparent to the skilled person that this approach can be extended to different numbers of RBGs.

FIG. 13 schematically illustrates an arrangement of lookup tables that can be used to determine the SINR associated with a differential sub-band CQI of 3. In the illustrated configuration, the lookup tables are arranged as an offset table 2006 and a sequence of tables 2008 each corresponding to a different reported wideband CQI. Lookup is performed in the table of the sequence of tables 2008 that is identified by the wideband CQI 2004. The table index at which to perform the lookup is determined based on the four digit numbers in base 17 using the offset index table 2006.

In the illustrated example, a wideband CQI 2004 of value 3 is received. This indicates that lookup is performed in the wideband CQI=3 table 2010 of the sequence of tables 2008. This table has an entry for each valid combination of RBGs. The index is derived based on the received sub-band CQI values 2000 which, in this case contains values of Sub-band CQI=[3, 2, 3, 0, 3, 1, 0, 3, 2, 0, 3, 0, 3, 0, 1, 2, 0]. Indicating that RBGs 3, 6, 9, 11, 13, and 16 have a differential sub-band CQI value of 0; RBGs 5 and 14 have a differential sub-band CQI of 1; RBGs 1, 8 and 15 have a differential sub-band CQI of 2; and RBGs 0, 2, 4, 7, 10 and 12 have a differential sub-band CQI of 3. Hence, the first 3 digits 2002 of the four digit number in base 17 are 6, 2, and 3 indicating that there are 6 RBGs with a differential sub-band CQI with a value of 0, 2

RBGs with a differential sub-band CQI with a value of 1 and 3 RBGs with a differential sub-band CQI with a value of 2. It is implicit (given that the sum of the digits of the four digit number have to add up to 17) that there are also 6 RBGs with a differential sub-band CQI of 3. Hence, the first three digits 2002 of the four digit number are sufficient to index into the wideband CQI=3 table 2006. In the illustrated example, the table index is determined by performing a first lookup in the offset index table 2006 using the number of RBGs with a differential sub-band CQI of 0 and the number of RBGs with a differential sub-band CQI of 1. In this case, a lookup is performed in row 6, column 2 of the offset index table 2006. The resulting value is added to the number of RBGs with a differential sub-band CQI of 2 in order to determine the index to use in the wideband CQI=3 table 2010. As a result, the SINR of the (in this case) six RBGs with a differential CQI equal to three can be determined as −8.44 dB. Hence, in some configurations, the steps of calculating the SINR for all possible combinations of RBGs with a differential CQI equal to three can be performed in advance using the techniques described herein and the results can be provided as a sequence of lookup tables.

The scheduling described in relation to FIGS. 6 to 13 provides a method for selecting particular RBGs to achieve a peak throughput for a downlink connection using information that is indicative of a signal quality. This mechanism (which can be referred to as an inner loop link adaptation) can, in some configurations, be supplemented with an additional outer loop link adaptation in which the information indicative of the signal quality is modified, prior to the step of re-ordering the RBGs, in dependence on information that is indicative of the actual BLER. In this approach, the SINR is modified by a correction factor which is chosen to cause the actual BLER to correspond closely to the target BLER. In other words, if signal quality is good and the actual BLER is below the target BLER, the outer loop link adaptation artificially modifies the SINRs by a correction factor in order to increase throughput which, in turn, drives up the BLER. The correction factor is continually updated based on an indication as to whether signals have been successfully received (an ACK is received) or have been incorrectly received (a NACK is received). As discussed, the target BLER is achieved by adjusting the current correction factor $\bar{\gamma}_k$ downwards by the downwards correction factor $\Delta^{down}$ upon the reception of a communication success (ACK), and upwards by the upwards correction factor $\Delta^{up}$ upon the reception of a communication failure (NACK) where, in order to maintain a particular block error rate ($\overline{BLER}$), the downwards correction factor is defined in terms of the upwards correction factor $$\Delta^{down} = \Delta^{up}\frac{\overline{BLER}}{1-\overline{BLER}}.$$

FIG. 14 schematically illustrates a base station (BS) 1300 that communicates with user equipment 1350. The user equipment 1350 is provided with a decoder 1352 that receives signals and transmits information indicative of a number of acknowledgements (ACKs) and negative acknowledgement (NACKs) to the base station 1300. The user equipment 1350 is also provided with a SINR to CQI convertor 1354 that determines a quality (SINR) associated with the transmissions and converts the information to CQI information, including wideband CQI information and differential sub-band CQI information, that is transmitted to the base station 1300. The base station 1300 is provided with inner loop link adaptation 1306, outer loop link adaptation 1304, a wideband CQI to wideband SINR convertor 1318 and a sub-band CQI to sub-band SINR convertor 1322. The wideband CQI to wideband SINR convertor 1318 receives the wideband CQI information from the user equipment 1350 and converts the wideband CQI information to a wideband SINR. The wideband SINR is passed from the wideband CQI to wideband SINR convertor 1318 to the sub-band CQI to sub-band SINR convertor 1322 (optionally, via filter 1320). The sub-band CQI to Sub-band SINR convertor 1322 determines the SINRs for each of the sub-bands. This information is output (optionally, via filter 1316) to the combination unit 1314. The outer loop link adaptation unit 1304 receives information indicative of the ACKs and NACKs from the user equipment 1350. The outer loop link adaptation takes a previous correction factor, provided by the delay unit 1302 and determines an updated correction factor. The updated correction factor is provided by the outer loop link adaptation unit 1304 to the delay unit 1302 and to the combination unit 1314. The combination unit 1314 combines the SINR for each of the sub-bands with the correction factor to provide a modified SINR for each of the sub-bands to the inner loop link adaptation unit 1312. The inner loop link adaptation unit 1306 is arranged to perform the re-ordering of the RBGs using the re-order unit 1308, the calculation of the power boosted SINRs using the power boost unit 1310 and the MCS and RBG selection using the MCS and RBG selector 1312. The base station 1300 then passes a downlink schedule including information of which MCS to use and which RBGs are to be selected to the UE 1350.

Next, the uplink scheduling circuitry will be described with reference to accompanying FIGS. 15 to 19. The operation of the uplink scheduling circuitry operates using similar principles to those set out in relation to the downlink scheduling circuitry and description of features that are common to the downlink scheduling circuitry and the uplink scheduling circuitry will be omitted for conciseness.

FIG. 15 schematically illustrates a configuration for a base station 1400 arranged to communicate with user equipment 1450 and arranged to schedule uplink transmissions between the base station 1400 and the user equipment 1450 according to various configurations of the present techniques. The user equipment 1450 is arranged to provide, to the base station 1400, uplink data from PUSCH unit 1452, sounding reference signals from SRS unit 1454 and buffer status reports from BSR unit 1456. The base station is provided with an outer loop link adaptation unit 1406 (which operates as described in relation to the downlink scheduling), inner loop link adaptation unit 1418, a PUSCH decoder 1408 and a sub-band SINR estimation unit 1410. The sub-band SINR estimation unit 1410 determines information indicative of transmission quality by estimating SINRs from the sounding reference signals provided by SRS unit 1454 in the user equipment 1450. The SINR estimates are passed, optionally via the filter 1412, to the combination unit 1416. The PUSCH decoder 1408 receives uplink data from the PUSCH unit 1452 of the user equipment 1450. The PUSCH decoder 1408 determines whether the uplink data has been received successfully or not and issues an ACK or NACK signal. The ACK/NACK signal is passed to the outer loop link adaptation unit 1406 which, in combination with the delay 1414 operates in the same manner as the outer loop link adaptation unit 1304 described in relation to FIG. 14. The correction factor from the outer loop link adaptation unit 1406 is passed to the combination unit 1416 which combines the correction factor with the sub-band SINR estimates provided by the sub-band SINR estimation unit 1410. The adjusted sub-band SINR estimates are passed from the combination circuit 1416 to the inner loop link adaptation unit 1418 where they are received by the joint MCS, power and RBG selector 1402. The joint MCS, power and RBG selection unit 1402 determines which RBGs are to be used for the uplink transmissions and the corresponding MCS based on calculation of an ESINR calculated in relation to the corrected sub-band SINR estimates. This is achieved using a sequence of lookup tables including an MCS lookup table 4122, a throughput lookup table 1420, and a power boost lookup table 1424. The method by which the base station 1400 calculates the MCS, power and RBGs will be described in detail below. The throughput tables for the uplink scheduling are different to those used in the downlink case. Exemplary throughput tables are set out in Tables 9 to 11.

TABLE 9

| UL throughput for various RBG sizes and MCS index 0 to 9 | | | | | | | | | | |
|---|---|---|---|---|---|---|---|---|---|---|
| RBG | 0 | 1 | 2 | 3 | 4 | 5 | 6 | 7 | 8 | 9 |
| 1 | 0.18 | 0.23 | 0.30 | 0.37 | 0.47 | 0.56 | 0.67 | 0.78 | 0.90 | 1.01 |
| 2 | 0.36 | 0.47 | 0.58 | 0.74 | 0.93 | 1.13 | 1.31 | 1.54 | 1.77 | 2.00 |
| 3 | 0.54 | 0.69 | 0.86 | 1.13 | 1.35 | 1.65 | 1.96 | 2.31 | 2.62 | 3.00 |
| 4 | 0.72 | 0.93 | 1.13 | 1.46 | 1.81 | 2.23 | 2.62 | 3.08 | 3.54 | 4.00 |
| 5 | 0.90 | 1.14 | 1.43 | 1.85 | 2.23 | 2.77 | 3.31 | 3.84 | 4.38 | 4.92 |
| 6 | 1.05 | 1.39 | 1.69 | 2.19 | 2.69 | 3.31 | 3.92 | 4.61 | 5.23 | 5.99 |
| 7 | 1.23 | 1.62 | 1.96 | 2.54 | 3.15 | 3.84 | 4.61 | 5.38 | 6.15 | 6.91 |
| 8 | 1.39 | 1.85 | 2.27 | 2.93 | 3.61 | 4.46 | 5.23 | 6.15 | 7.07 | 7.99 |
| 9 | 1.58 | 2.08 | 2.54 | 3.31 | 4.08 | 4.92 | 5.84 | 6.91 | 7.99 | 8.91 |
| 10 | 1.77 | 2.31 | 2.85 | 3.69 | 4.54 | 5.53 | 6.61 | 7.68 | 8.76 | 9.84 |
| 11 | 1.92 | 2.54 | 3.08 | 4.00 | 4.92 | 6.15 | 7.22 | 8.45 | 9.68 | 11.07 |
| 12 | 2.12 | 2.77 | 3.39 | 4.38 | 5.38 | 6.61 | 7.84 | 9.22 | 10.45 | 11.98 |
| 13 | 2.27 | 3.00 | 3.69 | 4.77 | 5.84 | 7.22 | 8.61 | 10.15 | 11.37 | 12.91 |
| 14 | 2.46 | 3.23 | 3.92 | 5.07 | 6.30 | 7.68 | 9.22 | 10.76 | 12.30 | 13.83 |
| 15 | 2.62 | 3.46 | 4.23 | 5.54 | 6.76 | 8.30 | 9.84 | 11.68 | 13.21 | 14.76 |

TABLE 9-continued

| UL throughput for various RBG sizes and MCS index 0 to 9 | | | | | | | | | | |
|---|---|---|---|---|---|---|---|---|---|---|
| RBG | 0 | 1 | 2 | 3 | 4 | 5 | 6 | 7 | 8 | 9 |
| 16 | 2.77 | 3.69 | 4.54 | 5.84 | 7.22 | 8.91 | 10.45 | 12.30 | 14.14 | 15.99 |
| 17 | 2.93 | 3.84 | 4.77 | 6.16 | 7.53 | 9.37 | 11.07 | 12.91 | 14.76 | 16.91 |

TABLE 10

| UL throughput for various RBG sizes and MCS index 10 to 19 | | | | | | | | | | |
|---|---|---|---|---|---|---|---|---|---|---|
| RBG | 10 | 11 | 12 | 13 | 14 | 15 | 16 | 17 | 18 | 19 |
| 1 | 1.01 | 1.13 | 1.27 | 1.42 | 1.62 | 1.81 | 1.92 | 1.92 | 2.04 | 2.27 |
| 2 | 2.00 | 2.19 | 2.54 | 2.85 | 3.23 | 3.61 | 3.84 | 3.84 | 4.08 | 4.54 |
| 3 | 3.00 | 3.31 | 3.77 | 4.31 | 4.84 | 5.38 | 5.84 | 5.69 | 6.15 | 6.76 |
| 4 | 4.00 | 4.38 | 5.07 | 5.69 | 6.45 | 7.22 | 7.68 | 7.68 | 8.15 | 9.07 |
| 5 | 4.92 | 5.53 | 6.30 | 7.22 | 8.15 | 9.07 | 9.68 | 9.68 | 10.15 | 11.37 |
| 6 | 5.99 | 6.61 | 7.68 | 8.61 | 9.68 | 10.76 | 11.68 | 11.68 | 12.30 | 13.53 |
| 7 | 6.91 | 7.68 | 8.91 | 10.15 | 11.37 | 12.61 | 13.53 | 13.53 | 14.45 | 15.99 |
| 8 | 7.99 | 8.91 | 10.15 | 11.37 | 12.91 | 14.45 | 15.37 | 15.37 | 16.29 | 18.14 |
| 9 | 8.91 | 9.84 | 11.37 | 12.91 | 14.45 | 16.29 | 17.22 | 17.22 | 18.45 | 20.28 |
| 10 | 9.84 | 11.07 | 12.61 | 14.45 | 16.29 | 18.14 | 19.37 | 19.37 | 20.28 | 22.74 |
| 11 | 11.07 | 12.30 | 13.83 | 15.67 | 17.83 | 19.68 | 20.90 | 20.90 | 22.74 | 25.20 |
| 12 | 11.98 | 13.21 | 15.37 | 17.22 | 19.37 | 21.51 | 23.37 | 23.37 | 24.60 | 27.06 |
| 13 | 12.91 | 14.45 | 16.59 | 18.75 | 20.90 | 23.37 | 25.20 | 25.20 | 26.42 | 29.52 |
| 14 | 13.83 | 15.37 | 17.83 | 20.28 | 22.74 | 25.20 | 27.06 | 27.06 | 28.88 | 31.98 |
| 15 | 15.06 | 16.59 | 19.06 | 21.51 | 23.97 | 27.06 | 28.88 | 28.88 | 30.73 | 33.80 |
| 16 | 15.99 | 17.83 | 20.28 | 22.74 | 25.81 | 28.88 | 30.73 | 30.73 | 32.57 | 36.28 |
| 17 | 16.91 | 18.75 | 21.51 | 23.97 | 27.06 | 30.12 | 32.57 | 32.57 | 34.44 | 38.13 |

TABLE 11

| UL throughput for various RBG sizes and MCS index 20 to 28 | | | | | | | | | |
|---|---|---|---|---|---|---|---|---|---|
| RBG | 20 | 21 | 22 | 23 | 24 | 25 | 26 | 27 | 28 |
| 1 | 2.46 | 2.69 | 2.92 | 3.15 | 3.38 | 3.61 | 3.84 | 4.00 | 4.15 |
| 2 | 4.92 | 5.38 | 5.84 | 6.30 | 6.76 | 7.22 | 7.68 | 7.99 | 8.30 |
| 3 | 7.53 | 8.15 | 8.76 | 9.53 | 10.15 | 10.76 | 11.37 | 11.98 | 12.61 |
| 4 | 9.84 | 10.76 | 11.68 | 12.61 | 13.53 | 14.45 | 15.37 | 15.99 | 16.59 |
| 5 | 12.30 | 13.53 | 14.76 | 15.67 | 16.91 | 18.14 | 19.06 | 19.68 | 20.90 |
| 6 | 15.06 | 16.29 | 17.52 | 19.06 | 20.28 | 21.51 | 22.74 | 23.97 | 25.20 |
| 7 | 17.52 | 19.06 | 20.28 | 22.14 | 23.97 | 25.20 | 27.06 | 27.66 | 28.88 |
| 8 | 19.68 | 21.51 | 23.37 | 25.20 | 27.06 | 28.88 | 30.73 | 31.98 | 33.19 |
| 9 | 22.14 | 24.60 | 26.42 | 28.28 | 30.73 | 32.57 | 34.44 | 35.67 | 37.51 |
| 10 | 24.60 | 27.06 | 29.52 | 31.35 | 33.80 | 36.28 | 38.13 | 39.36 | 41.82 |
| 11 | 27.66 | 29.52 | 31.98 | 34.44 | 37.51 | 39.36 | 41.82 | 44.28 | 45.48 |
| 12 | 30.12 | 32.57 | 35.04 | 38.13 | 40.59 | 43.02 | 45.48 | 47.97 | 50.40 |
| 13 | 32.57 | 35.04 | 38.13 | 40.59 | 44.28 | 46.74 | 50.40 | 51.66 | 54.12 |
| 14 | 35.04 | 38.13 | 40.59 | 44.28 | 47.97 | 50.40 | 54.12 | 55.33 | 57.79 |
| 15 | 37.51 | 40.59 | 44.28 | 47.97 | 50.40 | 54.12 | 57.79 | 60.24 | 62.70 |
| 16 | 39.36 | 43.02 | 46.74 | 50.40 | 54.12 | 57.79 | 61.50 | 63.96 | 66.42 |
| 17 | 41.82 | 45.48 | 49.20 | 52.86 | 57.79 | 61.50 | 65.14 | 67.65 | 70.08 |

In contrast to the scheduling of the downlink transmissions, the uplink transmission determines the sub-band SINR estimates locally (as opposed to having to reconstruct these based on the CQI information received from user equipment). Hence, the base station does not need to perform the steps of converting from the wide-band CQI information and the differential CQI information to obtain the sub-band SINR estimates. Instead, these are measured directly based on the sounding reference signals that are output by the UE.

In some configurations, the combination of RBGs that are usable for the uplink transmissions can be determined using the method set out in relation to FIGS. 6 to 13 with the added difference that the SINRs are determined from the sounding reference signals rather than being estimated from the received wideband and sub-band CQI values. Hence, the methods for determining an appropriate combination of RBGs as set out in relation to the downlink scheduling are equally applicable to the uplink scheduling. In addition, in some illustrated uplink configurations, the combinations of RBGs that are usable for uplink transmissions are restricted to contiguous subsets of the RBGs. Hence, there are fewer possible RBG combinations available in the uplink transmission scheduling than the case of the downlink transmission scheduling. In general, it may be the case that not all RBGs are available for resource allocation. FIG. 16 schematically illustrates an example of a set of corrected SINR values (in dB) for a set of RBGs. RBGs that are marked with an X are not available for resource allocation. In the illustrated example, RBGs 6-8, 13 and 14 are not available for resource allocation. RBG 0 has a SINR of 2.17 dB, RBG 1 has a SINR of 5.40 dB, RBG 2 has an SINR of 4.16 dB, RBG 3 has a SINR of 5.68, RBG 4 has a SINR of 3.22 dB, RBG 5 has a SINR of −1.59 dB, RBG 9 has a SINR of 6.87, RBG 10 has a SINR of 4.10 dB, RBG 11 has an SINR of 8.04, RBG 12 has a SINR of 4.13, RBG 15 has a SINR of 12.38 dB and RBG 16 has a SINR of 3.66 dB. There are numerous possible contiguous subsets of the RBGs that could be selected by the uplink scheduling circuitry. The aim of the uplink scheduling circuitry is to determine the contiguous subset of the RBGs for which the total throughput of the uplink transmissions is maximised.

One method by which the contiguous subset of RBGs is selected is schematically illustrated in FIG. 17. Flow begins at step S1600 where a number of variables are set including R, the total number of RBGs, S(r) the SINR for the RBG group indicated by the index r, and V(r) which is a binary variable that indicates whether the RBG indicated by the index r is valid or invalid and it is assumed that V(n) indicates that the RBG is invalid for n≥R. Flow then proceeds to step S1602 where the index r is initiated to −1. Flow then proceeds to step S1604 where r is incremented by a value of 1. Flow then proceeds to step S1606 where it is determined whether r is equal to R. If so then all possible contiguous subsets of RBGs have been considered and flow proceeds to step S1622 where the stored values of r and n that are associated with the stored best throughput are retrieve and, based on these values of r and n, any values of V that fall in the range from V[r] to V[n] are set to invalid indicating that the corresponding RBGs have been selected and flow terminates. If, at step S1606, it was determined that r is not equal to R, indicating that the search is not yet complete, then flow proceeds to step S1608 where n is set equal to r. The variables r and n are used to define a start RBG and an end RBG of a contiguous subset of the RBGs. Initially n is set to r corresponding to case in which a size of the contiguous subset that is being considered is equal to a single RBG. Flow then proceeds to step S1610 where it is determined whether or not V(r) indicates that the n-th RBG is valid. If the n-th RBG is not valid then flow returns to step S1604. If however, at step S1610, it was determined that the n-th RBG is valid then it is determined that all RBGs in the currently considered subset of contiguous RBGs are valid and flow proceeds to step S1612. It can be determined that all the RBGS within the currently considered subset are valid because, as will be seen in the forthcoming steps, the size of a subset of RBGs is increased by 1 RBG at each iteration. Hence, if the previous subset of RBGs is valid then, since in the first case the only RBG is the n-th one, it is only the n-th RBG that needs to be tested to determine the validity of the whole subset. Flow then proceeds to step S1612 where the ESINR is calculated for RBGs r to n (the currently considered subset of contiguous RBGs. Flow then proceeds to step S1614 where the ESINR is mapped to an MCS value at a given target BLER, for example, using Table 4. Flow then proceeds to step S1616 where the throughput is determined, for example, using Tables 9 to 11. Flow then proceeds to step S1618 where the current best throughput associated with the corresponding r, n and MCS is stored. Flow then proceeds to step S1620 where n is incremented before flow returns to step S1610. Once the flow set out in relation to FIG. 17 is complete, the best throughput is determined as the best throughput stored at step S1618. The RBGs that result in the stored best throughput are fully defined at this point. In particular, the values r, n and the corresponding MCS and throughput are each stored. The RBGs that result in the throughput are therefore the n contiguous RBGs that start at RBG index r and use the stored MCS. In contrast to the downlink case (see FIG. 12), due to the requirement that the RBGs are contiguous, there is no freedom to choose from a range of possible groups of RBGs that result in this throughput.

The ESINR, MCS and throughput for each possible subset of contiguous RBGs is illustrated in FIGS. 18*a*, 18*b*, and 18*c* respectively for each possible subset of contiguous RBGs calculated for the example SINRs set out in FIG. 16. Each row of FIGS. 18*a*, 18*b*, and 18*c* refers to an initial RBG index for the subset and each column of FIGS. 181, 18*b*, and 18*c* refers to the number of contiguous RBGs included in that subset. For example, row 0 of FIGS. 18*a*, 18*b*, and 18*c* corresponds to the subsets that start with RBG 0. There are six possible contiguous subsets of RBGs that start with RBG index 0, corresponding to the six contiguous RBGs of FIG. 16 before unavailable RBG 6. Rows 6-8 and 13-14 of the example set out in FIGS. 18*a*, 18*b*, and 18*c* are blank because these RBGs are unavailable and, hence, no contiguous available subset is possible that starts with these RBGs.

FIG. 18*a* illustrates the ESINR for each possible subset calculated based on the SINR values provided in FIG. 16. The corresponding MCS values (calculated, for example, using Table 4) are illustrated in FIG. 18*b*. The corresponding throughput values (calculated, for example, using the MCS values of FIG. 18*a* and Tables 9-11) are illustrated in FIG. 18*c*. It can be seen from FIG. 18*c* that a peak throughput 1500*c* of 9.07 Mbps ($Mb \cdot s^{-1}$) can be found for the subset of RBGs that start with RBG index 0 and that contain 5 contiguous RBGs. The corresponding MCS 1500*b*, as illustrated in FIG. 18*b*, is 15 and the corresponding SINR 1500*a*, as illustrated in FIG. 18*a*, is 8.70. As can be seen in FIG. 18*c*, the addition of a further RBG, such that there are 6 RBGs starting at RBG index 0 results in a throughput in Mbps of 7.68 Mbps 1502*c* and removing an RBG such that there are only 4 RBGs starting at RBG index 0 results in a throughput of 7.68 Mbps 1504*c*. Similarly, considering 5 RBGs but starting at RBG index 1 results in a throughput of 6.30 Mbps 1506*c*. Hence, there is a peak throughput observed for this particular combination of RBGs. Hence, it is determined that, for the exemplary SINRs set out in FIG. 16, the RBGs that provide the peak throughput are RBGs 0-4.

FIG. 19 schematically illustrates a sequence of steps carried out in accordance with some configurations of the present techniques. Flow begins at step S1700 where information indicative of a quality of a wireless uplink connection is received. Flow then proceeds to step S1702 where an uplink transmission configuration is determined. The uplink transmission configuration defines a subset of uplink resource blocks allocated to the wireless uplink connection, the subset of uplink resource blocks is determined based on a simultaneous consideration of both of the quality of the wireless uplink connection and a power spectrum distribution of a total power budget across the uplink resource blocks. Furthermore, the power spectrum distribution is non-uniform across the uplink resource blocks In brief overall summary there is provided an apparatus and a method of operating an apparatus, the apparatus is comprising: communication circuitry configured to receive information indicative of a quality of a wireless uplink connection; and scheduling circuitry configured to determine an uplink transmission configuration defining a subset of uplink resource blocks allocated to the wireless uplink connection, the subset of uplink resource blocks determined based on a simultaneous consideration of both of the quality of the wireless uplink connection and a power spectrum distribution of a total power budget across the uplink resource blocks, wherein the power spectrum distribution is non-uniform across the uplink resource blocks. As discussed, by simultaneously considering both the quality of the wireless transmission and the power spectrum distribution, a range of different potential uplink transmission configurations, each comprising a different set of resource block groups with a different power spectrum distribution, can be determined. By providing scheduling circuitry that is arranged to determine an uplink transmission configuration from the potential uplink transmission configurations, for example, based on an estimated throughput or an estimated overall signal quality, an improved communication throughput can be achieved.

In the present application, the words "configured to . . . " are used to mean that an element of an apparatus has a configuration able to carry out the defined operation. In this context, a "configuration" means an arrangement or manner of interconnection of hardware or software. For example, the apparatus may have dedicated hardware which provides the defined operation, or a processor or other processing device may be programmed to perform the function. "Configured to" does not imply that the apparatus element needs to be changed in any way in order to provide the defined operation.

Although illustrative configurations have been described in detail herein with reference to the accompanying drawings, it is to be understood that the invention is not limited to those precise configurations, and that various changes, additions and modifications can be effected therein by one skilled in the art without departing from the scope and spirit of the invention as defined by the appended claims. For example, various combinations of the features of the dependent claims could be made with the features of the independent claims without departing from the scope of the present invention.

The invention claimed is:

1. An apparatus comprising:

communication circuitry configured to receive information indicative of a quality of a wireless uplink connection; and scheduling circuitry configured to determine an uplink transmission configuration defining a subset of uplink resource blocks of a plurality of uplink resource blocks, each uplink resource block of the plurality of uplink resource blocks including a plurality of subcarriers, the subset of uplink resource blocks being allocated to the wireless uplink connection, and the subset of uplink resource blocks being determined based on a simultaneous consideration of both (i) the quality of the wireless uplink connection for each of the plurality of uplink resource blocks and (ii) a power spectrum distribution of a total power budget across the plurality of uplink resource blocks, wherein the power spectrum distribution is non-uniform across the plurality of uplink resource blocks.

2. The apparatus of claim 1, wherein the subset of uplink resource blocks is a contiguous subset of the plurality of uplink resource blocks.

3. The apparatus of claim 2, wherein the uplink resource blocks, of the contiguous subset of the uplink resource blocks, are contiguously allocated frequency ranges in a frequency domain.

4. The apparatus of claim 1, wherein:

the scheduling circuitry is configured to determine, as part of the uplink transmission configuration, modulation coding scheme information associated with the subset of uplink resource blocks; and the modulation coding scheme information is determined based on the simultaneous consideration of both of the quality of the wireless uplink connection for each of the plurality of uplink resource blocks and the power spectrum distribution of the total power budget across the plurality of uplink resource blocks.

5. The apparatus of claim 4, wherein the scheduling circuitry is configured to determine the subset of uplink resource blocks based on the modulation coding scheme information.

6. The apparatus of claim 4, wherein the scheduling circuitry is configured to select the uplink transmission configuration from a plurality of potential uplink transmission configurations each defining a corresponding contiguous subset of uplink resource blocks.

7. The apparatus of claim 6, wherein:

the scheduling circuitry is configured to estimate, for each of the plurality of potential uplink transmission configurations, an uplink communication throughput based on a corresponding power spectrum distribution of the total power budget across the corresponding contiguous subset of uplink resource blocks; and the uplink transmission configuration is selected as one of the plurality of potential uplink transmission configurations having a highest estimated uplink communication throughput.

8. The apparatus of claim 7, wherein the scheduling circuitry is further configured to estimate, for each of the plurality of potential uplink transmission configurations, the uplink communication throughput based on the modulation coding scheme information associated with the corresponding contiguous subset of uplink resource blocks.

9. The apparatus of claim 5, wherein the information indicative of the quality of the wireless uplink connection comprises a plurality of signal to interference and noise ratios, each indicative of a reference signal associated with one of the uplink resource blocks of a wireless uplink signal received from a communication device by the communication circuitry.

10. The apparatus of claim 9, wherein the communication circuitry is configured to transmit the uplink transmission configuration to the communication device.

11. The apparatus of claim 9, wherein the modulating coding scheme information is calculated based on a non-linear combination of the plurality of signal to interference and noise ratios associated with the subset of uplink resource blocks.

12. The apparatus of claim 11, wherein the non-linear combination is obtained by converting each of the plurality of signal to interference and noise ratios to a resulting value on a linear scale and averaging the resulting values.

13. The apparatus of claim 1, wherein the communication circuitry is configured to receive information indicative of an uplink communication event, and wherein the apparatus further comprises correction circuitry configured to modify the information indicative of the quality of the wireless uplink connection by a correction factor based on the information indicative of the uplink communication event.

14. The apparatus of claim 13, wherein the information indicative of the quality of the wireless uplink connection is a signal to interference and noise ratio and the correction factor is added to the signal to interference and noise ratio.

15. The apparatus of claim 13, wherein the correction factor is dynamically selected in order to achieve a predetermined block error rate.

16. The apparatus of claim 15, wherein:

the correction factor is decreased by a downward correction factor in response to the information indicative of the uplink communication event indicating a communication success; and the correction factor is increased by an upwards correction factor in response to the information indicative of the uplink communication event indicating a communication failure.

17. The apparatus of claim 16, wherein the upwards correction factor is greater than the downwards correction factor.

18. The apparatus of claim 16, wherein a ratio of the upwards correction factor and the downwards correction factor is selected in order to achieve the predetermined block error rate.

19. The apparatus of claim 1, wherein the power spectrum distribution comprises a non-zero power allocated to the subset of uplink resource blocks and zero power allocated to a further subset of the uplink resource blocks, and the further subset of the uplink resource blocks and the subset of the uplink resource blocks are mutually exclusive subsets.

20. The apparatus of claim 19, wherein the non-zero power is dependent on a size of the subset of the uplink resource blocks.

21. A method of operating an apparatus, the method comprising:

receiving information indicative of a quality of a wireless uplink connection; and determining an uplink transmission configuration defining a subset of uplink resource blocks of a plurality of uplink resource blocks, each uplink resource block of the plurality of uplink resource blocks including a plurality of subcarriers, the subset of uplink resource blocks being allocated to the wireless uplink connection, and the subset of uplink resource blocks being determined based on a simultaneous consideration of both (i) the quality of the wireless uplink connection for each of the plurality of uplink resource blocks and (ii) a power spectrum distribution of a total power budget across the plurality of uplink resource blocks, wherein the power spectrum distribution is non-uniform across the plurality of uplink resource blocks.

22. An apparatus comprising:

means for receiving information indicative of a quality of a wireless uplink connection; and means for determining an uplink transmission configuration defining a subset of uplink resource blocks of a plurality of uplink resource blocks, each uplink resource block of the plurality of uplink resource blocks including a plurality of subcarriers, the subset of uplink resource blocks being allocated to the wireless uplink connection, and the subset of uplink resource blocks being determined based on a simultaneous consideration of both (i) the quality of the wireless uplink connection for each of the plurality of uplink resource blocks and (ii) a power spectrum distribution of a total power budget across the plurality of uplink resource blocks, wherein the power spectrum distribution is non-uniform across the plurality of uplink resource blocks.

* * * * *